(12) United States Patent
Volkerink et al.

(10) Patent No.: US 11,514,286 B2
(45) Date of Patent: Nov. 29, 2022

(54) METHOD FOR FAST REPLACEMENT OF WIRELESS IOT PRODUCT AND SYSTEM THEREOF

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/492,641

(22) Filed: Oct. 3, 2021

(65) Prior Publication Data

US 2022/0108143 A1    Apr. 7, 2022

Related U.S. Application Data

(60) Provisional application No. 63/087,283, filed on Oct. 4, 2020.

(51) Int. Cl.
*G06K 19/07* (2006.01)

(52) U.S. Cl.
CPC ..... *G06K 19/0723* (2013.01); *G06K 19/0702* (2013.01)

(58) Field of Classification Search
CPC ............... G06K 19/0723; G06K 19/0702
USPC ................................................ 235/492
See application file for complete search history.

(56) References Cited

U.S. PATENT DOCUMENTS

| | | | |
|---|---|---|---|
| 6,614,392 B2 | 9/2003 | Howard | |
| 7,797,367 B1 | 9/2010 | Gelvin et al. | |
| 9,565,622 B2 | 2/2017 | Chikkappa et al. | |
| 9,773,220 B2 | 9/2017 | Blanchard et al. | |
| 9,794,753 B1 | 10/2017 | Stitt et al. | |
| 11,372,882 B1* | 6/2022 | Dervay | G06F 9/547 |
| 2004/0098371 A1* | 5/2004 | Bayliss | G06F 16/2471 |
| 2005/0063313 A1 | 3/2005 | Nanavati et al. | |
| 2007/0049291 A1 | 3/2007 | Kim et al. | |
| 2009/0290511 A1 | 11/2009 | Budampati et al. | |

(Continued)

FOREIGN PATENT DOCUMENTS

| AU | 2018250358 A1 | 5/2019 |
|---|---|---|
| CA | 3061878 A1 | 11/2018 |

OTHER PUBLICATIONS

U.S. Appl. No. 10/123,294, filed Nov. 6, 2018, Thompson et al.

(Continued)

*Primary Examiner* — Michael G Lee
*Assistant Examiner* — David Tardif

(57) ABSTRACT

A method and system for replacing a first wireless node in an IoT system includes determining, by the first wireless node, that the first wireless node needs imminent replacement. The determination may be made, for example, based on a battery of the first wireless node being below a threshold level. The first wireless node initiates a discovery protocol for a second wireless node installed in proximity to the first wireless node, the second wireless node installed to replace the first wireless node. Upon discovery of the second wireless node, the first wireless node transmits a configuration file to the second wireless node, which the second wireless node copies to a storage of the second wireless node. The second wireless node configures itself to operate as a replacement for the first wireless node in the IoT system, based at least in part on the copied configuration file.

20 Claims, 19 Drawing Sheets

(56) References Cited

U.S. PATENT DOCUMENTS

| | | |
|---|---|---|
| 2010/0082870 A1 | 4/2010 | Tokuhara |
| 2011/0035491 A1 | 2/2011 | Gelvin et al. |
| 2011/0141879 A1 | 6/2011 | Ballard |
| 2013/0002044 A1 | 1/2013 | Takehara et al. |
| 2013/0272180 A1 | 10/2013 | Hiremath et al. |
| 2015/0180971 A1 | 6/2015 | Varney et al. |
| 2015/0208255 A1 | 7/2015 | Belk |
| 2015/0249482 A1 | 9/2015 | Czaja |
| 2015/0349917 A1 | 12/2015 | Skaaksrud |
| 2016/0112249 A1* | 4/2016 | Schiff ............... H04L 41/0806 709/221 |
| 2016/0233927 A1 | 8/2016 | Wu |
| 2017/0238035 A1 | 8/2017 | Perez |
| 2017/0280351 A1 | 9/2017 | Skaaksrud |
| 2018/0084371 A1 | 3/2018 | Scagnol et al. |
| 2018/0139726 A1 | 5/2018 | Choi et al. |
| 2018/0163095 A1* | 6/2018 | Khoche ..................... C09J 7/38 |
| 2018/0165568 A1 | 6/2018 | Khoche |
| 2018/0279179 A1 | 9/2018 | Norlen et al. |
| 2018/0293513 A1 | 10/2018 | Sugaya |
| 2018/0321356 A1 | 11/2018 | Kulkarni et al. |
| 2018/0365635 A1 | 12/2018 | Lucrecio et al. |
| 2019/0042378 A1* | 2/2019 | Wouhaybi ............. H04L 67/565 |
| 2019/0113632 A1 | 4/2019 | Lucrecio et al. |
| 2019/0116091 A1 | 4/2019 | Bijavara Aswathanarayana Rao et al. |
| 2019/0138534 A1 | 5/2019 | Bernat et al. |
| 2019/0158606 A1 | 5/2019 | Guim Bernat et al. |
| 2019/0222055 A1 | 7/2019 | Khoche et al. |
| 2019/0285724 A1 | 9/2019 | Meadow |
| 2019/0362215 A1 | 11/2019 | Khoche |
| 2019/0370624 A1 | 12/2019 | Khoche |
| 2021/0084457 A1 | 3/2021 | Volkerink et al. |
| 2021/0084566 A1* | 3/2021 | Kuenzi ............... H04W 40/246 |

OTHER PUBLICATIONS

U.S. Appl. No. 10/313,925, filed Jun. 4, 2019, Jones et al.
U.S. Appl. No. 10/379,842, filed Aug. 13, 2019, Malladi et al.
U.S. Appl. No. 10/595,274, filed Mar. 17, 2020, Khaled et al.
U.S. Appl. No. 11/003,978, filed May 11, 2021, Khoche.
International Patent Application No. PCT/US2021/053282 International Search Report and Written Opinion dated Dec. 29, 2021, 10 pages.
PCT International Search Report, International Application No. PCT/US 20/50728. International search completed Nov. 5, 2020. International Search Report dated Dec. 16, 2020. pp. 1-2.
Luo et al "Self-securing Ad Hoc Wireless Networks." Proceedings of the Seventh International Symposium on Computers and Communications (ISCC'02). 1530-1346/02, 2002, IEEE Computer Society.
Pagani et al. "Resource sharing between neighboring nodes in heterogeneous Wireless Sensor Networks." 2015 European Conference on Networks and Communications (EuCNC). Conference dates Jun. 29 to Jul. 2, 2015.
Lucrecio et. al. "Systems and Methods for Hybrid Cloud-Edge Computing Method for Automated Decision Making and Probabilistic Occurrence." U.S. Appl. No. 62/520,348, filed Jun. 15, 2017. Expired.
International Patent Application No. PCT/US2021/038140, International Search Report and Written Opinion dated Nov. 8, 2021, 11 pages.
Hassan et al. "A Design of Packages Tracking System Based on Radio Frequency Identification" IEEE 2018.

* cited by examiner

1300

Wireless node A installed on asset and initialized with configuration file A
1310

Wireless node A indicates that it needs replacement
1320

Human operator installs wireless node B on asset in proximity to wireless node A
1330

(Optional) Human operator provides stimulus to at least one of wireless node A and wireless node B
1340

Wireless node A and Wireless node B perform discovery protocol
1350

Wireless node A transmits configuration file A to wireless node B, and wireless node B copies the received configuration file A
1360

Wireless node B confirms to wireless node A that it has successfully completed its configuration based on configuration file A
1365

Wireless node A ceases functioning and wireless node B begins functioning according to configuration file A
1370

(Optional) Human operator removes wireless node A from Asset
1380

Wireless node A, which includes configuration file A, continuously searches for a replacement tape node
1410

Wireless node B, located near wireless node A, periodically transmits a request to receive a configuration file
1412

Wireless node A receives the request from Wireless node B and confirms that tape node B will receive configuration file A
1414

Wireless node A transmits configuration file A to wireless node B, and wireless node B copies the received configuration file A
1416

Wireles node B continuously transmits a request to receive a configuration file from another wireless node
1420

Wireless node A, which includes configuration file A and is located near wireless node B, periodically searches for a replacement tape node
1422

Wireless node A receives the request from Wireless node B and confirms that tape node B will receive configuration file A
1414

Wireless node A transmits configuration file A to wireless node B, and wireless node B copies the received configuration file A
1416

```
┌─────────────────────────────────────────────────────────────────────┐
│ Wireless node A installed on an asset and initialized with          │
│ configuration file A                                                │
│ 1510                                                                │
└─────────────────────────────────────────────────────────────────────┘
                                    ▼
┌─────────────────────────────────────────────────────────────────────┐
│ Wireless node A notifies intermediary device (e.g., gateway device  │
│ or client device) that imminent replacement is necessary            │
│ 1520                                                                │
└─────────────────────────────────────────────────────────────────────┘
                                    ▼
┌─────────────────────────────────────────────────────────────────────┐
│ Human operator installs wireles node B on asset within proximity    │
│ of wireless node A                                                  │
│ 1530                                                                │
└─────────────────────────────────────────────────────────────────────┘
                                    ▼
┌─────────────────────────────────────────────────────────────────────┐
│ Wireless node B notifies intermediary device that it is ready to    │
│ receive a configuration file                                        │
│ 1540                                                                │
└─────────────────────────────────────────────────────────────────────┘
                                    ▼
┌─────────────────────────────────────────────────────────────────────┐
│ Intermediary device syncs time with wireless node A and wireless    │
│ node B                                                              │
│ 1550                                                                │
└─────────────────────────────────────────────────────────────────────┘
                                    ▼
┌─────────────────────────────────────────────────────────────────────┐
│ Intermediary device instructs wireless node A and wireless node B   │
│ to discover each other at a specified time.                         │
│ 1560                                                                │
└─────────────────────────────────────────────────────────────────────┘
                                    ▼
┌─────────────────────────────────────────────────────────────────────┐
│ Wireless node A and wireless node B discover each other at the      │
│ specified time, and wireless node A transfers the configuration     │
│ file A to wireless node B after discovering wireless node B         │
│ 1570                                                                │
└─────────────────────────────────────────────────────────────────────┘
```

FIG. 15A

METHOD FOR FAST REPLACEMENT OF WIRELESS IOT PRODUCT AND SYSTEM THEREOF

CROSS-REFERENCE TO RELATED APPLICATIONS

This application claims priority to U.S. Provisional Patent Application No. 63/087,283, filed Oct. 4, 2020, which is incorporated herein in its entirety.

FIELD OF THE DISCLOSURE

This disclosure generally relates to wireless internet of things (IoT) devices.

BACKGROUND

For an IoT system employing battery-powered IoT devices, the replacement of IoT devices that have low or depleted batteries is an arduous task with increased complexity, as the scale and size of the IoT device network increases. Since conventional IoT devices may require extensive configuration before being deployed in the field, replacing a single IoT device in the field with a new IoT Device may require significant attention and effort. Additionally, errors may occur from improper tracking of the replacements, such as when two IoT devices are performing the same task due to the IoT device that was meant to be replaced not being removed or deactivated in a timely fashion.

SUMMARY

A method and system thereof for replacing a first wireless node in an IoT system is disclosed. The method includes determining, by the first wireless node, that the first wireless node is in need of imminent replacement. The first wireless node may determine this based on a battery level of the first wireless node, for example. The first wireless node transmits a first notification to another wireless node of the IoT system that the first wireless node is in need of imminent replacement. The IoT system may deploy a second wireless node in the field to be installed in proximity to the first wireless node, in response to receiving the first notification. The first wireless node then initiates a discovery protocol for the second wireless node installed in proximity to the first wireless node. Upon discovery of the second wireless node, the first wireless node wirelessly connects with the second wireless node. Responsive to successful wireless connection between the first wireless node and the second wireless node, the first wireless node transmits a configuration file to the second wireless node, and the second wireless node copies the received configuration file to a storage of the second wireless node. The second wireless node configures itself to operate as a replacement for the first wireless node in the IoT system, based at least in part on the copied configuration file. The second wireless node thus replaces the first wireless node. In further embodiments, the first wireless node may complete the process by deactivating itself.

Also disclosed herein is a an adhesive tape platform, which is a flexible IoT device including a flexible substrate, a device layer, a battery, a flexible circuit connecting components of the device layer and a flexible cover layer covering the flexible substrate, the device layer, and the flexible circuit. The device layer includes a processor, a first wireless communication system, and a memory coupled to the processor. The adhesive tape platform is configured to wirelessly receive a configuration file from a first wireless node using the first wireless communication system, copy the received configuration file to the memory, and complete a configuration of the adhesive tape platform as a replacement for the first wireless node based at least in part on copied configuration file.

An Internet of Things (IoT) system is also disclosed, according to some embodiments, that includes a first IoT device and a second IoT device. The first IoT device is installed on an asset and includes first type of wireless communication system. The first IoT device is configured to monitor the asset and transmit a configuration file using the first type of wireless communication system to an IoT device replacing the first IoT device, in response to determining that the first wireless node needs imminent replacement.

The second IoT device is installed in proximity to the first IoT device, in response to the first IoT device determining that the first IoT device needs imminent replacement. The second IoT device is installed to serve as a replacement for the first IoT device in the IoT system. The second IoT device includes the first type of wireless communication system and is configured to wirelessly receive the configuration file from the first wireless node using the first type of wireless communication system. The second IoT device completes a configuration process for replacing the first IoT device based at least in part on the received configuration file. Responsive to the second IoT device completing the configuration process, the second IoT begins operating, assuming a role and identity of the first IoT device in the IoT system.

BRIEF DESCRIPTION OF THE DRAWINGS

FIG. 13 is a flow chart showing steps for an example method of configuring a wireless node of the IoT system for fast replacement, according to some embodiments.

FIGS. 14A-14B are flow charts each showing steps for an example discovery process for a first wireless node deployed in the field and a second wireless node replacing the first wireless node, according to some embodiments.

FIG. 15A is a flow chart showing steps for an example method of configuring a wireless node of the IoT system for fast replacement of an existing wireless node in an IoT system by using an intermediary device which coordinates the configuration, according to some embodiments.

DETAILED DESCRIPTION

Figure 1A:
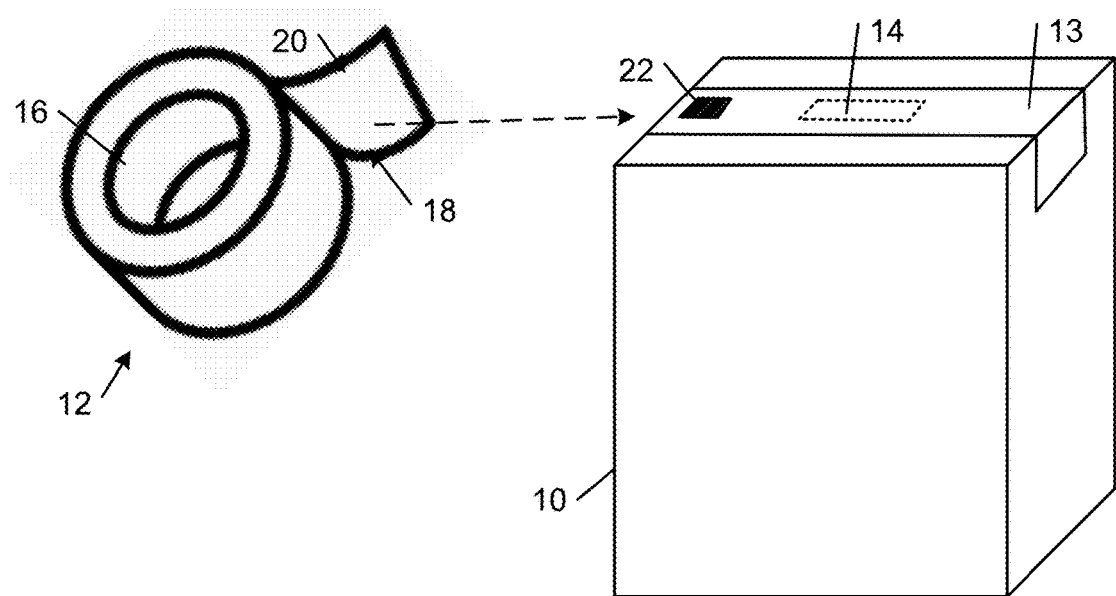
FIG. 1A is a diagrammatic view of an asset that has been sealed for shipment using a segment of an example adhesive tape platform dispensed from a roll, according to some embodiments.

A method and system thereof for replacing a first wireless node in an IoT system is disclosed. The method includes installing a second wireless node in proximity to the first wireless node. The first wireless node then wirelessly transmits a configuration file to the second wireless node, which is used to configure the second wireless node as a replacement for the first wireless node. Based on the received configuration file, the second wireless node assumes the role and identity of the first wireless node in the IoT system. The second wireless node confirms to the first wireless node that the second wireless node has successfully replaced the first wireless node. In response, the first wireless node deactivates itself to allow the second wireless node to operate as the first wireless node's replacement. The second wireless node may undergo a similar process with a third wireless node, when the second wireless node is in need of imminent replacement.

The disclosed method and system thereof allows for a fast process for replacing the first wireless node that requires little interaction or attention from a human operator, compared to conventional methods for installing and deploying an IOT device in the field to fulfill a role in an IOT system. In an IoT system that includes a large network of battery-powered IoT devices, the disclosed method and system thereof greatly simplifies the process of replacing individual IoT devices or wireless nodes.

In some embodiments, the wireless IoT device or wireless node is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
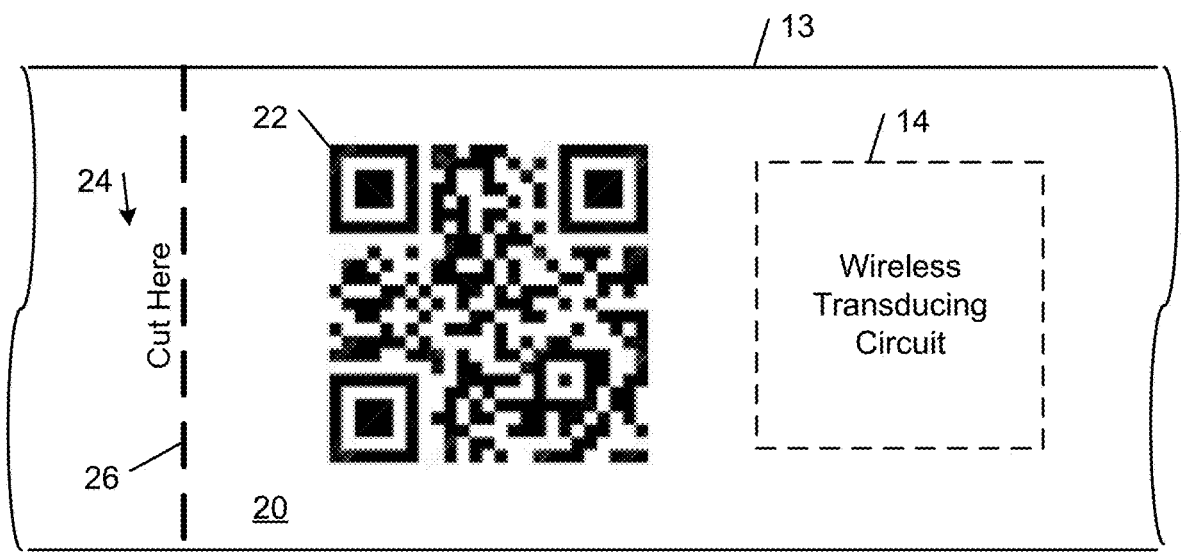
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
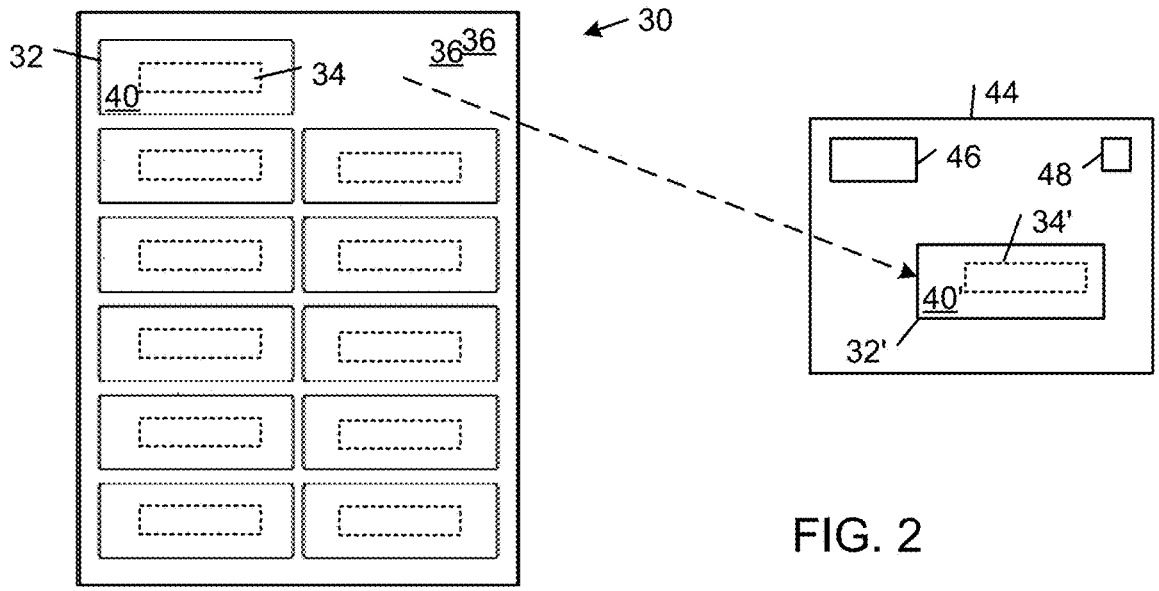
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
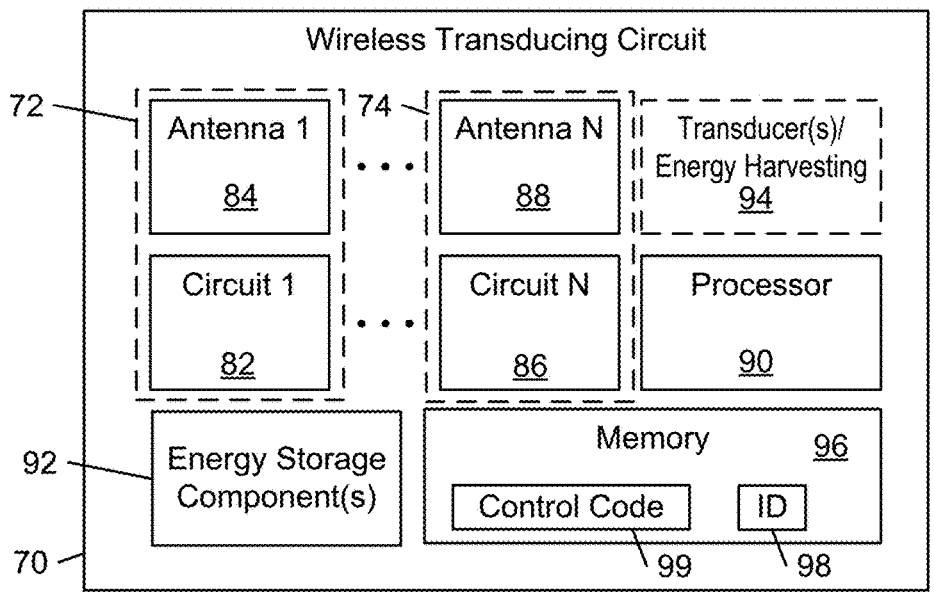
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
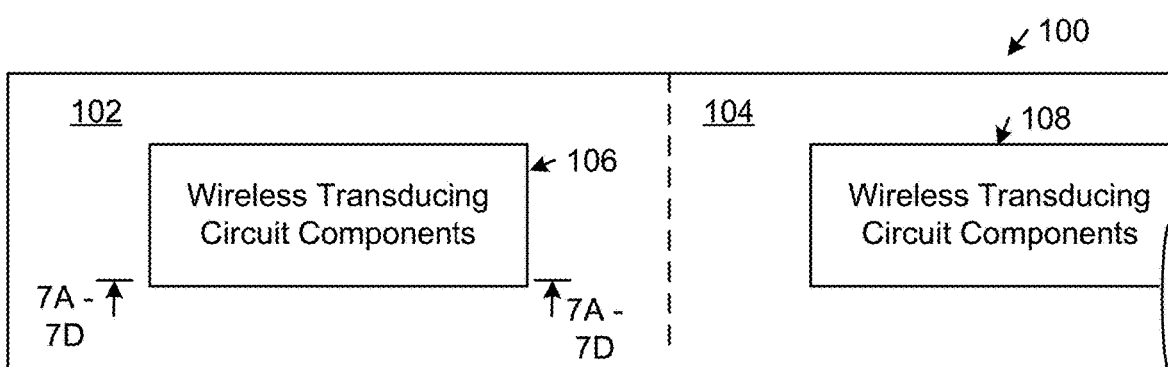
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
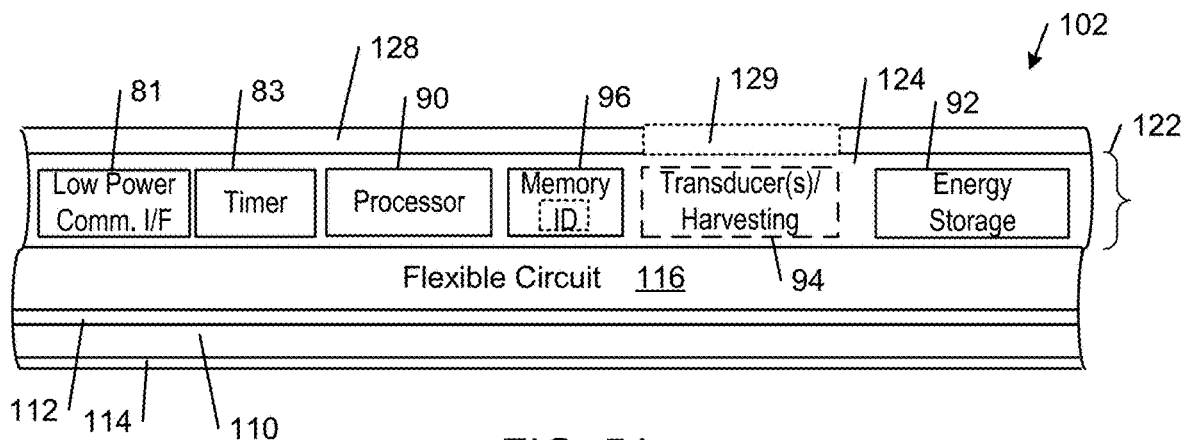
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
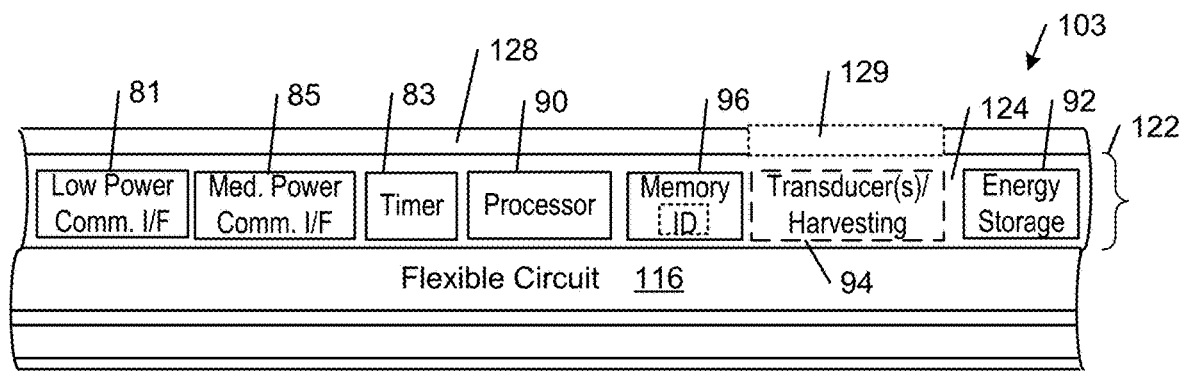

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
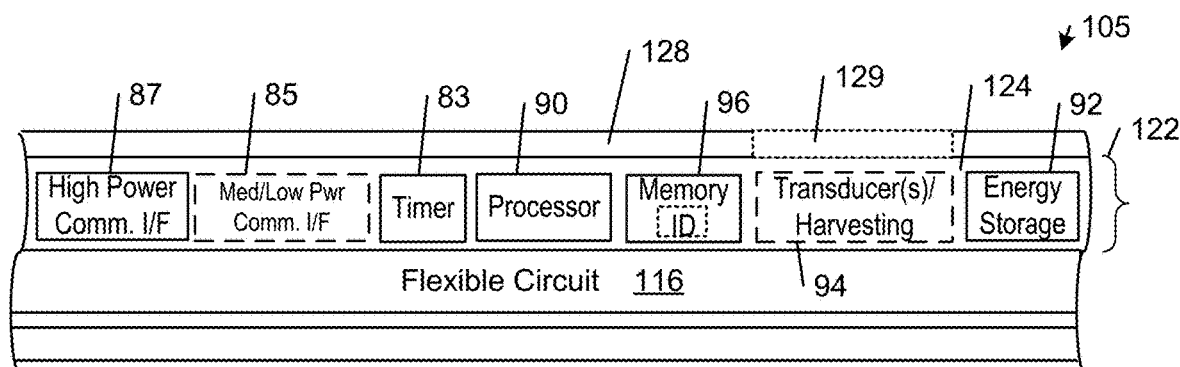

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
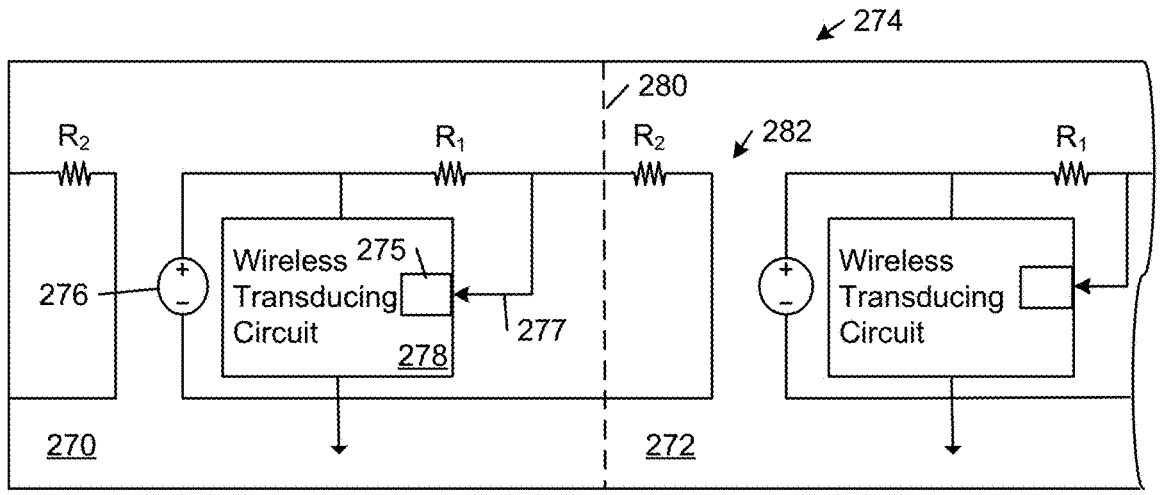
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
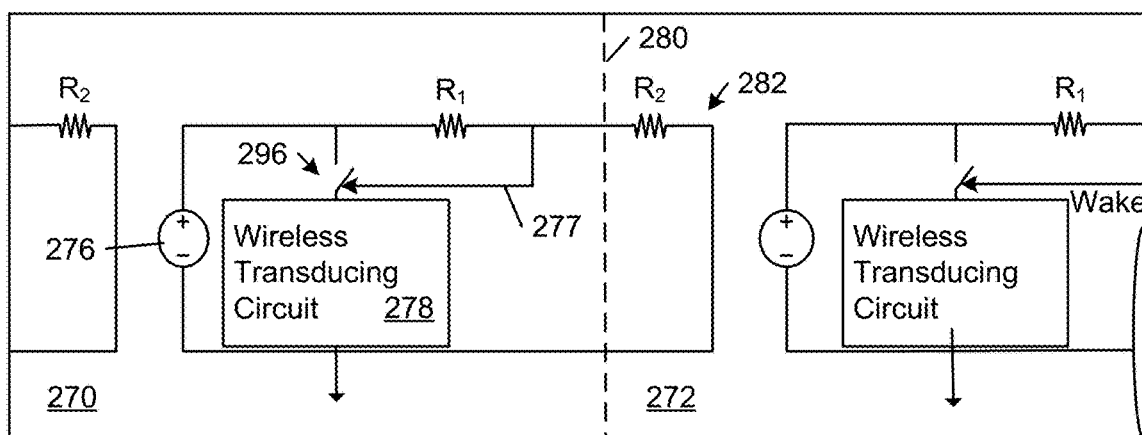

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
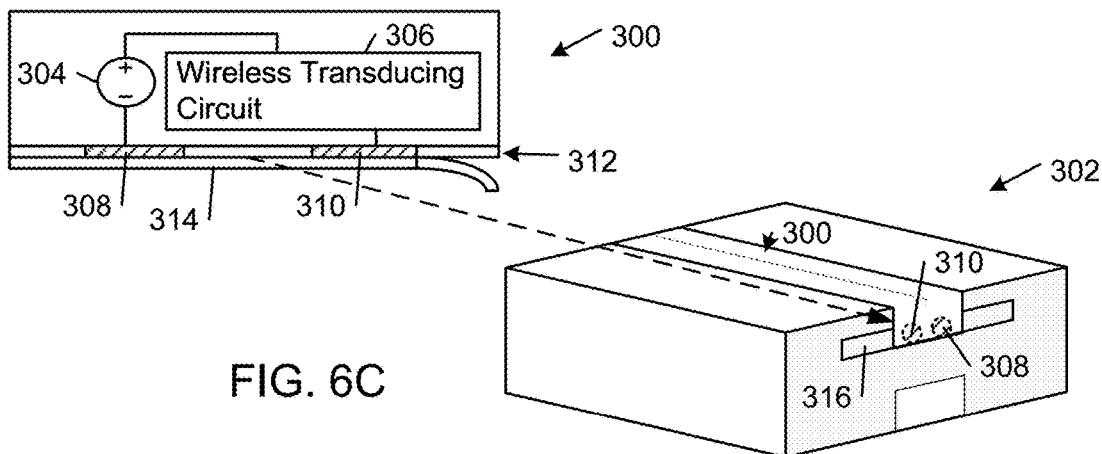
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
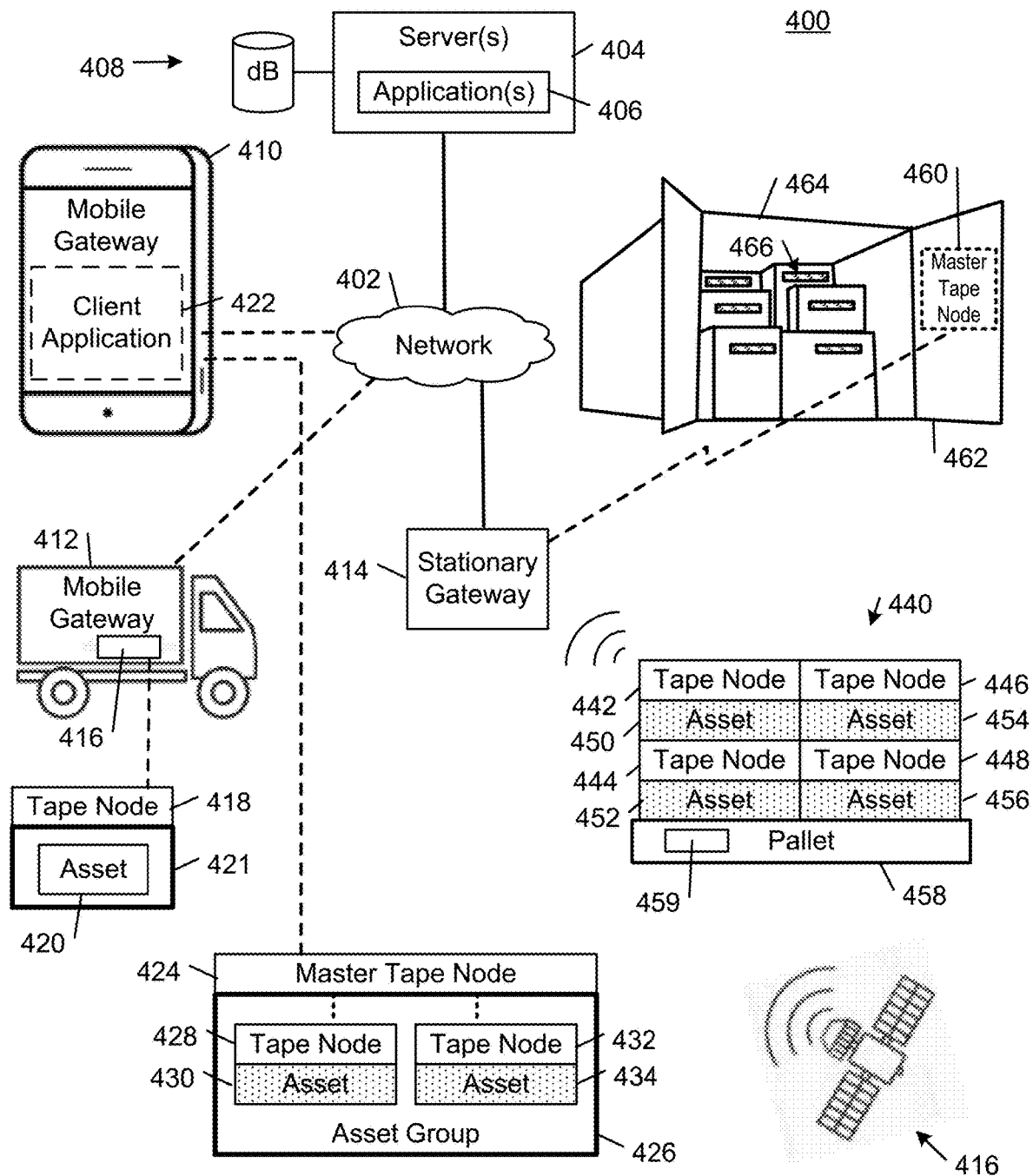
FIG. 7 is a diagrammatic view of an example of a network environment supporting communications with segments of an adhesive tape platform, according to some embodiments.

FIG. 7 shows an example network communications environment 400 (also referred to herein as an "IoT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IoT system 400 may be referred to as a node of the IoT system 400, including the tape nodes, other wireless IoT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
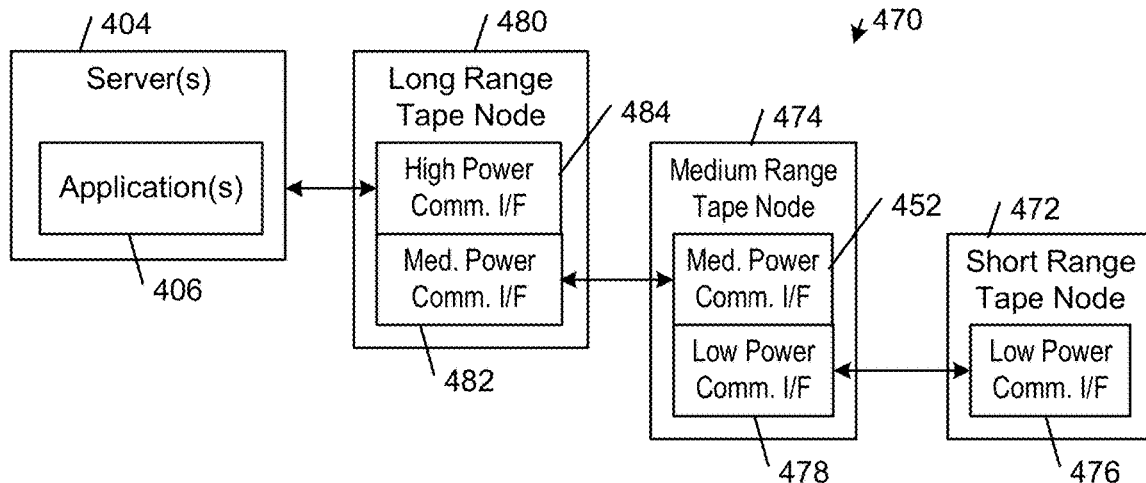
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
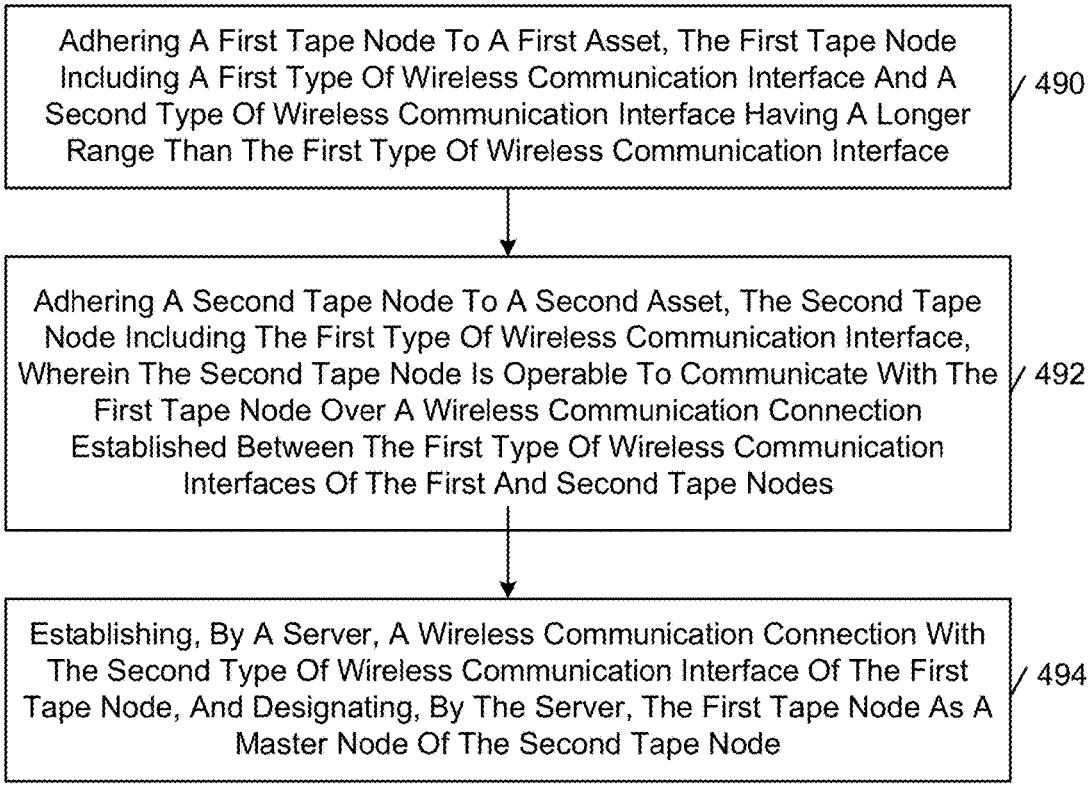
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles)

that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
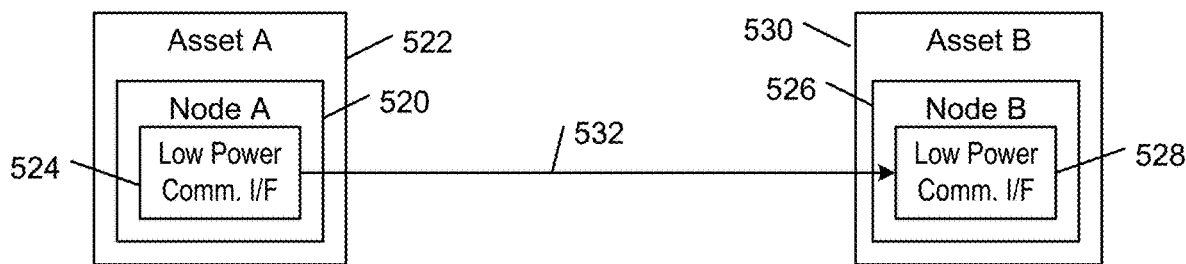
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
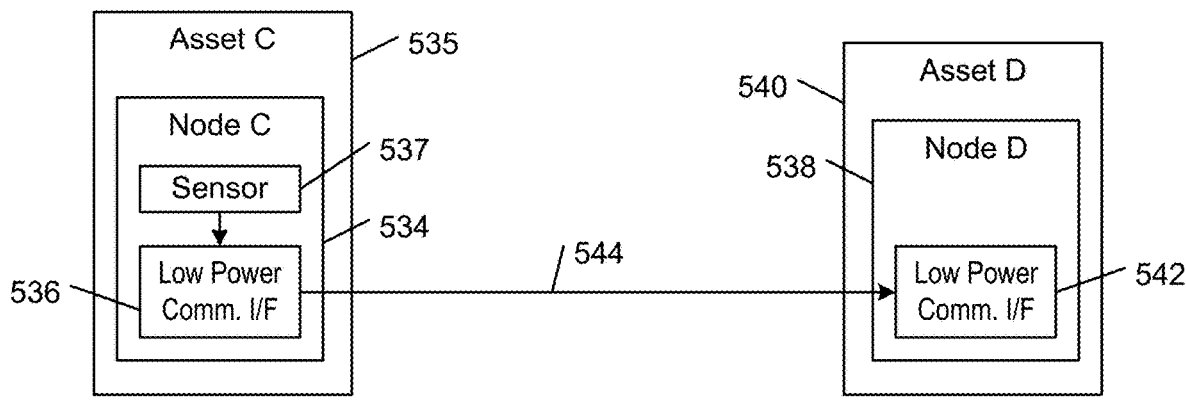

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
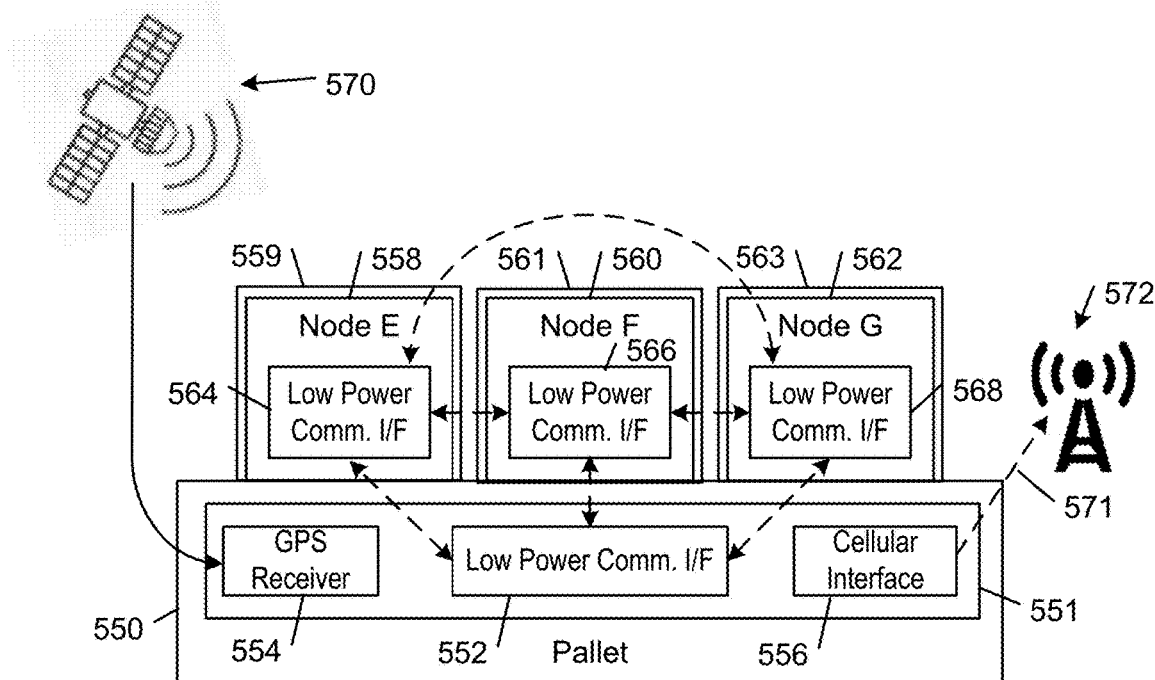

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
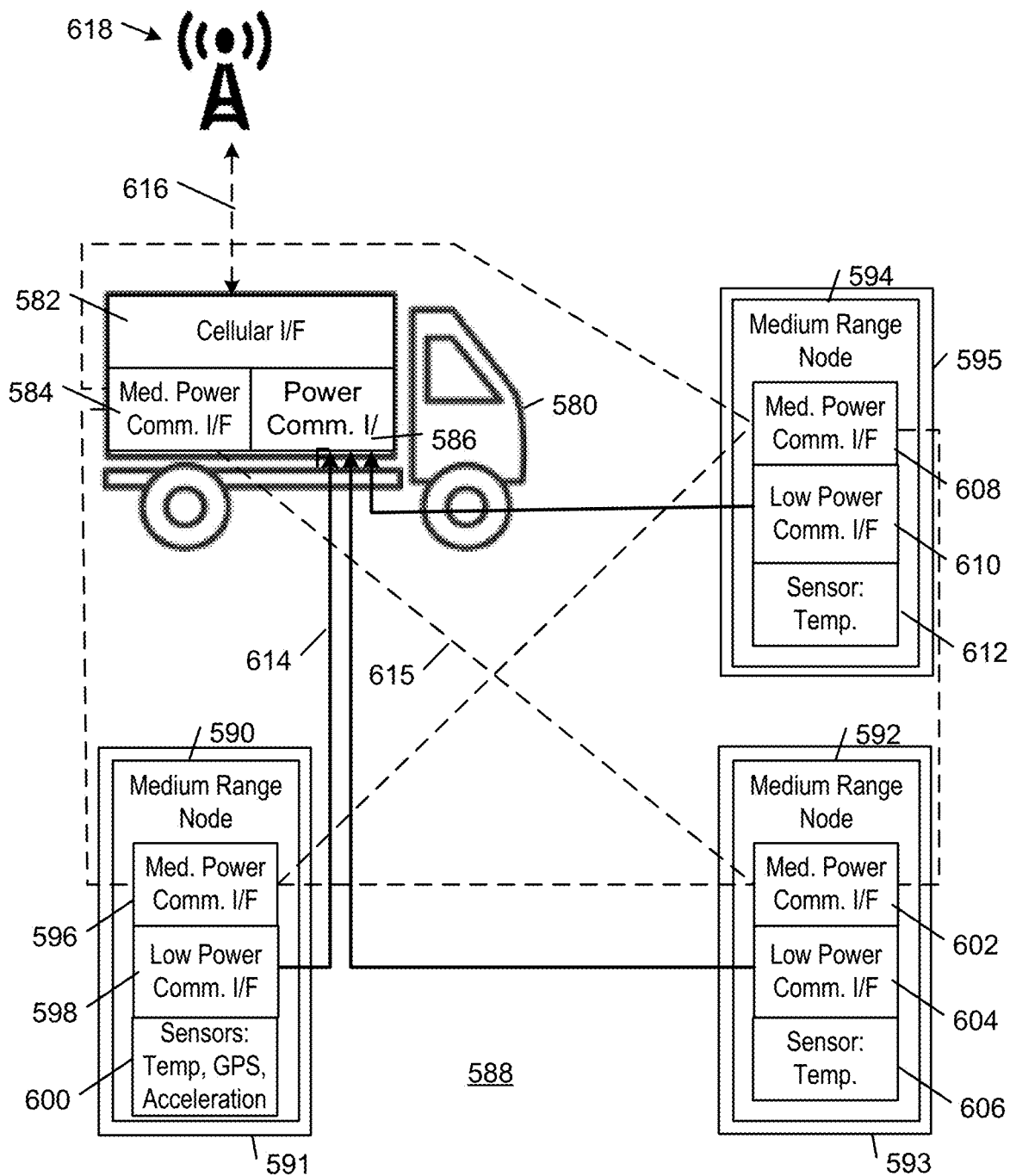

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
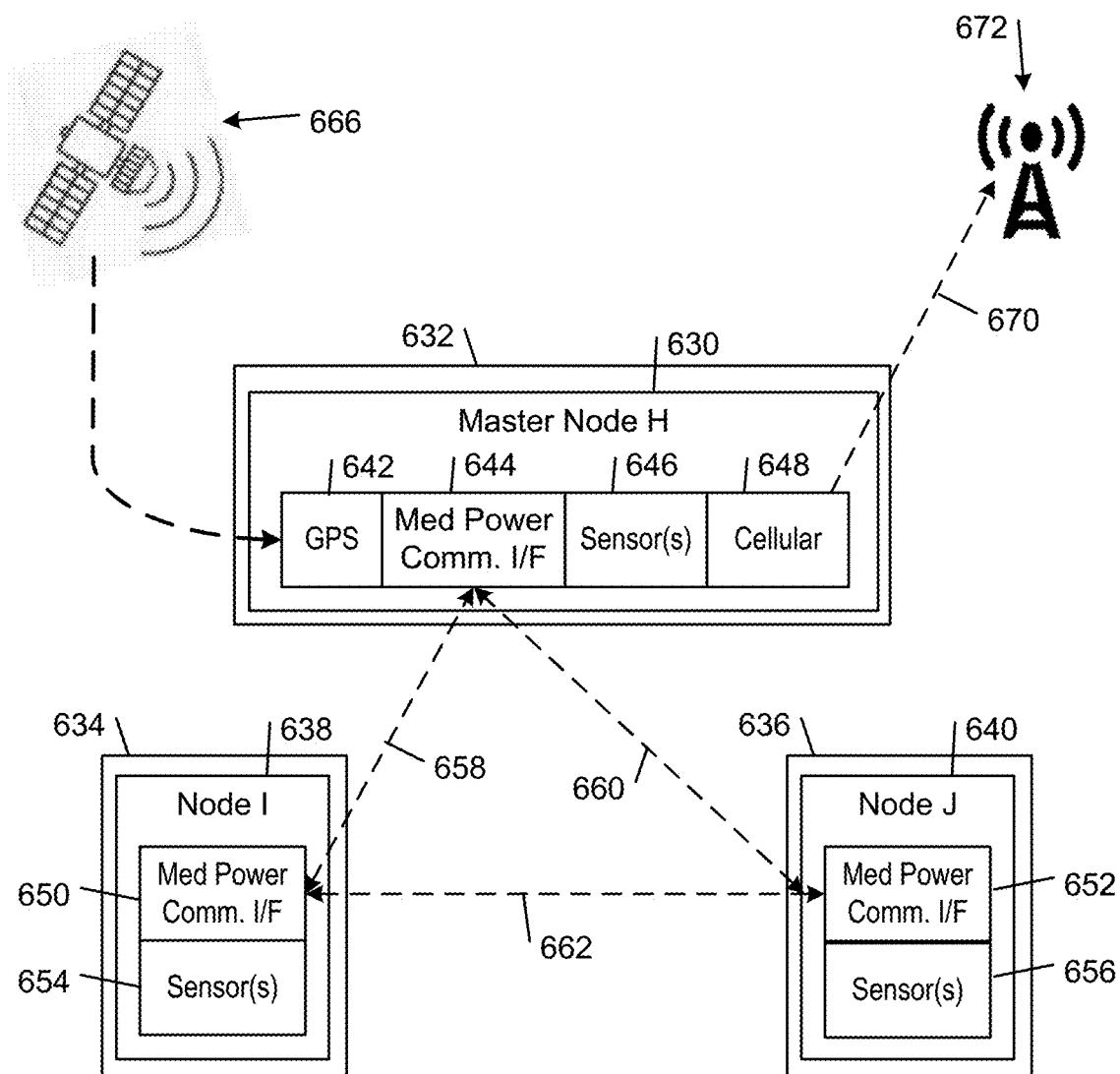

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Fast Replacement of Wireless Nodes

Figure 11:
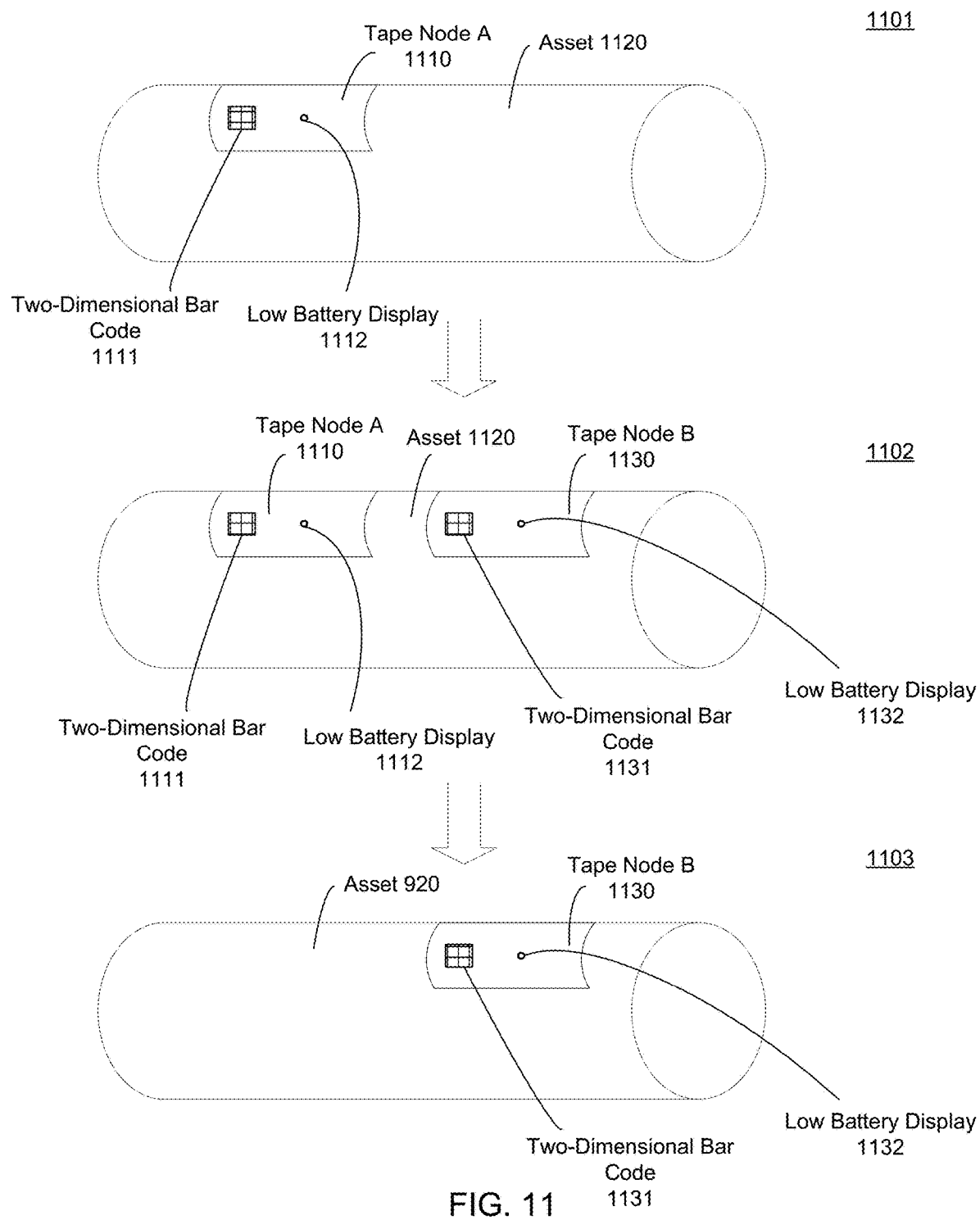
FIG. 11 is a diagram showing an example of phases of a process for fast replacement of a wireless node, according to some embodiments.

FIG. 11 is a diagram showing an example of phases 1101, 1102, 1103 of a disclosed process for fast replacement of a tape node, according to some embodiments. In this example a tape node 1110 (Tape Node A) has been adhered to a surface of an asset 1120. The Tape Node A is a wireless node of an embodiment of the IoT system 400. The Tape Node A includes a two-dimensional barcode 1111 that appears on the non-adhesive side of the Tape Node A. The Tape Node A may include wireless communication components and/or sensor components as described above, with respect to FIGS. 2-4 and 5A-5C. The Tape Node A is able to wirelessly communicate with other wireless nodes of the IoT system 400. The Tape Node A includes at least a first wireless communication system (e.g., Bluetooth) for communicating with other tape nodes within a first communication range. In some embodiments, the Tape Node A also includes a second wireless communication system (e.g., LoRa) having a second communication range for communicating with a gateway device or another tape node capable of communicating via the second wireless communication system. The second communication range may be longer than the first communication range, according to some embodiments.

In a first phase 1101 of the example replacement process, the Tape Node A is at a low battery level (e.g., it's battery level is lower than as low threshold value) and requires an imminent replacement before the Tape Node A depletes its battery so that the IoT system 400 does not lose functionality associated with the Tape Node A when the Tape Node A's battery is depleted. In some embodiments, the Tape Node A is associated with the asset 1120 and is configured to monitor information on the asset 1120. The information on the asset 1120 may include sensor data from sensors of the Tape Node A. The information may include a location of the asset 1120, in some embodiments. The asset 1120 may be a stationary object, such as a fixed piece of equipment that's installed at a location, or a mobile object, such as a parcel or a tool that may be carried to different locations.

In some embodiments, in response to detecting that its own battery level is low or below a threshold level, the Tape Node A broadcasts a wireless signal that indicates the need for replacement of Tape Node A. For example, the Tape Node A may broadcast an alert to other wireless nodes of the IoT system 400. This alert may be transmitted directly to the server(s) 404, if the Tape Node A is capable of connecting to the server(s) directly or through a gateway node of the IoT system 400. For example, if the Tape Node A and a gateway node are both within the first wireless communication range, with the gateway node having a wireless communication system compatible with the first wireless communication system of the Tape Node A, wherein the gateway node is also wirelessly connected to the server(s) through an internet connection or a cellular communication connection, the Tape Node A may transmit the alert to the gateway node which in turn relays the alert to the server(s). The server(s), in response to receiving the alert, may issue a notification and/or instructions to a user of the IoT system on an associated client device (e.g., a smartphone) via an app installed on the client device. The instructions may include instructions to initiate the replacement process or to inspect the Tape Node A. In further embodiments, the server(s) locates the closest user to the location of the Tape Node A and selects them to receive the notification and initiate the replacement process.

In other embodiments, the Tape Node A broadcasts the alert to any wireless node of the IoT system that is within the first wireless communication range via the first wireless communication system. The wireless node that receives the alert may be a client device (e.g., a smartphone) associated with a user of the IoT system 400. In this case, the client device may display a notification and/or further instructions via an app installed on the client device. The app may, for example, instruct the user to initiate the replacement process or instruct the user to inspect the Tape Node A. In The alert may include instructions to search for a nearby user with a client device, according to some embodiments.

In the example of FIG. 11, the Tape Node A includes a display 1112 (e.g., an indicator LED) that indicates that the Tape Node A needs replacement. While in the example shown in FIG. 11, the display 1112 is an LED indicator light, the display 1112 may be another type of display such as an LCD screen, an electronic paper (e-paper) display, an LED display, an LED array, some other type of display, or some combination thereof. In further embodiments, the display 1112 may indicate or display other information or statuses of the Tape Node A. For example, the display 1112 may illuminate with a green color while the Tape Node A is operating in a normal status and illuminate with a red color when the Tape Node A is in need of imminent replacement. In other examples, the display 1112 may show a current battery level. In other embodiments, the Tape Node A does not include the display 1112. The Tape Node A may also include a speaker, according to some embodiments, that plays an audio cue or alarm when the Tape Node A is in need of imminent replacement.

In a second phase 1102, in response to receiving the indication that the Tape Node A needs replacement, the IoT system 400 prompts a human operator or a machine (e.g., a robot or robotic arm) to initiate the replacement by adhering a second tape node 1130 (Tape Node B) to the asset 1120 in proximity to the Tape Node A. When a human operator is prompted to initiate the replacement, the IoT system 400 may do so by sending a notification to the human operator's client device which displays the notification on a corresponding app, according to some embodiments. The notification may indicate a type of tape node to use, which corresponds to a type of tape node associated with Tape Node A. The notification may include additional information on the tape node, such as a location of the tape node.

In the case of a human operator performing the replacement, the human operator installs a second tape node 1130 (Tape Node B) in a location near Tape Node A. The Tape Node B may be installed on a same asset 1120 as the Tape Node A, when the Tape Node A is on an asset. In embodiments, where the Tape Node A is not installed on an asset, but is installed on a surface in an environment, such as a wall or a door, the Tape Node B may not necessarily be required to be installed on the same surface. For instance in the case that Tape Node A is installed on a wall of an indoor or outdoor environment, the Tape Node B may be installed on a different surface (e.g., another wall or the floor) as long as it is within a threshold distance of Tape Node A. The threshold distance may be based on the wireless communication range of Tape Node A and Tape Node B, a distance from a location that is associated with the Tape Node A, a role or function that Tape Node A serves in the IoT system 400, some other factor, or some combination thereof. In some embodiments, the Tape Node B may be installed as close as possible to the Tape Node A, without overlapping the Tape Node A, according to some embodiments. In some embodiments, the human operator is guided by the app on the client device on where to place the Tape Node B. For example, the app may instruct the human operator to install the Tape Node B within a threshold distance (e.g., within 3 feet) of the Tape Node A.

After installation of Tape Node B on asset 1112, the human operator can then leave the location of the asset 1120, and the Tape Node B will be configured by Tape Node A, without any intervention from the human operator or any other user. In some embodiments, before leaving the location, the human operator performs an action or provides a stimulus to one or more of the Tape Node A and the Tape Node B to initiate a discovery process for the two tape nodes. Embodiments of the discovery process is discussed in further detail below, with respect to FIGS. 13A-13C. The discovery process includes the two tape nodes establishing a wireless communication connection, each tape node using a respective first wireless communications system that is compatible with the other's. For example, the human operator may scan the two-dimensional bar code on each of the Tape Node A and Tape Node B with a client device that includes a barcode scanner or a camera. In response to the scanning of the bar codes, the client device communicates to each of the Tape Node A and the Tape Node B, instructing them both to initiate their respective discovery process, according to some embodiments. The scanning and communication with the tape nodes may be carried out using the app on the client device. In other examples, the Tape Node A and the Tape Node B each include a sensor or component that can detect changes in the magnetic field around the respective tape node. In this case, the stimulus may include the human operator bringing a magnet or a magnetic device near each of the Tape Node A and the Tape Node B. In other examples, the stimulus includes a light that the human operator shines on a portion of the Tape Node A and the Tape Node B that is detected by a respective optical sensor in each of the tape nodes. Other stimulus may be used for initiating the discovery process In some embodiments, only the Tape Node B receives a stimulus from the human operator, and the Tape Node B initiates its own discovery process, in response to the stimulus. In such cases, the Tape Node A is configured to receive a wireless signal from the Tape Node B which initiates its own respective discovery process for configuring Tape Node B. The Tape Node A may be configured to periodically check for an incoming signal from Tape Node B after Tape Node A determines that Tape Node A itself is in need of imminent replacement. The frequency at which the Tape Node A checks for an incoming signal may be predetermined, and the Tape Node B may repeatedly transmit its signal to Tape Node A for a duration and with a frequency that corresponds to the frequency at which Tape Node A checks until the two tape nodes successful establish a wireless communication connection. In an example, the stimulus includes shaking the Tape Node B, which is detected by a vibration sensor in the Tape Node B. In one example, the stimulus includes the act of cutting a portion of the Tape Node B, which results in a part of a circuit located in the cut portion being broken by the cut, similar to the wake circuit described above with respect to FIGS. 6A-6B. The circuit detects a change to the circuit or a change in impedance in a portion of the circuit that results from the cut, and in response, the Tape Node B initiates its respective discovery process.

The Tape Node B has the same hardware components and capabilities as the Tape Node A, according to some embodiments. In other embodiments, the Tape Node B has different hardware components and capabilities (e.g., different sensor and wireless communication components) than the Tape Node A, but has an overlapping set of capabilities that allows Tape Node B to provide the same functionality and operate with the same identity as the Tape Node A. The Tape Node B has the first wireless communication system for communicating with the Tape Node A.

In the second phase 1102 of the example replacement process, Tape Node A and Tape Node B discover each other via a wireless communication connection (e.g., using the first wireless communication system). The discovery process may include a handshake process, to confirm that Tape Node B is the correct node or IoT device for replacing Tape Node A and operating with the identity of Tape Node A. Part of the handshake process may include determining that Tape Node A and Tape Node B are within the correct distance to each other based on the received signal strength of the wireless connection between the Tape Node A and the Tape Node B (e.g., measured by the first wireless communication system). If the two tape nodes are not within the correct distance or distance range from each other, one or more of the two tape nodes may transmit an alert to a nearby wireless node, such as a nearby client device associated with a user. In other embodiments, the distance between Tape Node A and Tape Node B are determined by other methods (for example by locationing systems such as GPS or triangulation of wireless signals). If the Tape Node B is at a distance higher than a threshold distance for the configuration process, the Tape Node A may not transfer its configuration files to Tape Node B. For example, the Tape Node B being at a distance higher from Tape Node A than the threshold distance may correspond to the Tape Node B being adhered to a different object or location than the asset 1120. Thus, in such a case, it would be inappropriate to configure Tape Node B with the identity of Tape Node A.

A configuration file includes data, parameters, programmatic code, software, and firmware for configuring a wireless node of the IoT system 400 to perform its role and define its identity as an agent in the IoT system 400. The role and identity of the wireless node in the IoT system 400 includes all functions and services that the wireless node performs during its operational lifetime. The configuration file may include portions of or entire software and firmware that may be installed on the storage or memory of a wireless node. The configuration file may include updates or patches for software and firmware on a wireless node, according to some embodiments. The configuration file may also include versions of software and/or firmware that the wireless node must download and install in order to complete its configuration. The configuration file may include a plurality of software files.

After Tape Node A and Tape Node B have completed the discovery process and the handshake process, Tape Node A transmits its configuration file to Tape Node B, and Tape Node B copies the received configuration file to its own memory. The Tape Node B then completes the configuration by configuring its software, firmware, and hardware based on the received configuration file, such that the Tape Node B assumes the identity and role of Tape Node A in the IoT system 400. The Tape Node B then notifies the Tape Node A that the Tape Node B has completed configuration and begins operating with the identity that Tape Node A previously assumed. The Tape Node A then stops functioning according to the identity it previously assumed, in response to receiving the notification confirming that the Tape Node B has replaced Tape Node A.

The Tape Node B takes over the identity and role of Tape Node A within the IoT system 400. The configuration file may include one or more identifiers that are associated with Tape Node A, that the Tape Node B will now copy as its own identifiers after the completion of the replacement process. The one or more identifiers may include software identifiers, networking addresses, other identifiers, or some combination thereof. In some embodiments, the configuration file includes one or more apps, code, or software that the Tape Node B installs on its own memory and executes using its one or more processors. The Tape Node B may also configure its own software or firmware based on parameters included in the configuration file received from Tape Node A. The configuration file may comprise multiple files, according to some embodiments.

In some embodiments, a database of a server of the IoT system 400 is updated to indicate that the Tape Node B has taken over the former role of Tape Node A. The IoT system 400 may receive a unique identifier or hardware identifier of Tape Node B and associate that with the former role of Tape Node B. The IoT system 400 may further disassociate a unique identifier or hardware identifier of Tape Node A from the role that Tape Node B is now assuming. Thus, the Tape Node A will no longer perform its former role and will not interfere with the operation of Tape Node B or cause confusion in the IoT system 400 by performing duplicate functions as Tape Node B. In further embodiments, the Tape Node A then goes to sleep, shuts down, performs functions to deplete its own batteries, or some combination thereof.

Tape Node B may also transmit a notification to other nodes of the IoT system confirming that it has replaced Tape Node A, in some embodiments. Alternatively, the Tape Node A may transmit the confirmation notification to nearby wireless nodes before it shuts down or goes to sleep. In a further embodiment, the Tape Node A continuously transmits the confirmation notification in order to both confirm the completion of the replacement and deplete its own battery to below a threshold battery level. In some embodiments, the user is notified via the app on the client device that the replacement and configuration has been completed.

After the configuration of the Tape Node B for replacement of Tape Node A has completed, a human operator or a machine (e.g., a robot or robotic arm) may remove the Tape Node A from the asset 1120 in a third phase 1103 of the example replacement process. In some embodiments, the Tape Node A is not removed and remains on the asset 1120. The third phase 1103 may happen after a significant amount of time after the second phase 1102. For example, a human operator may not return to the asset 1120 to remove the Tape Node A until a time ranging from an hour to several weeks after the first phase 1101. Since a human operator does not need to be present or manually overseeing the configuration of the Tape Node B during replacement, the amount of time and attention a human operator or user needs to devote to the replacement process is minimal. In some examples, a human operator may schedule a time to collect multiple old tape nodes (like Tape Node A) which have been replaced but are still on their respective associated assets in an area, simplifying the task of removing the old tape nodes when the IoT system includes a large network of tape nodes.

While in the above example, with respect to FIG. 11, the IoT system 400 initiates the replacement process in response to detecting a low battery level of the Tape Node A, the IoT system 400 may also initiate the replacement process in response to detecting another event. The other event may include the Tape Node A failing a diagnostic test which measures the performance of the features of Tape Node A. For example, if the Tape Node A or another wireless node of the system performs a diagnostic test on the received signal strengths and transmitted signal strengths of Tape Node A, the IoT system 400 may initiate the replacement process in response to determining that one or more of the received signal strengths and transmitted signal strengths is below or above a threshold level. The other event may include the Tape Node A receiving physical damage or experiencing a malfunctioning. The other event may include a threshold period of time expiring since the initial installation of Tape Node A. For example, the Tape Node A may be scheduled to be replaced at regular intervals, according to some embodiments.

Figure 12:
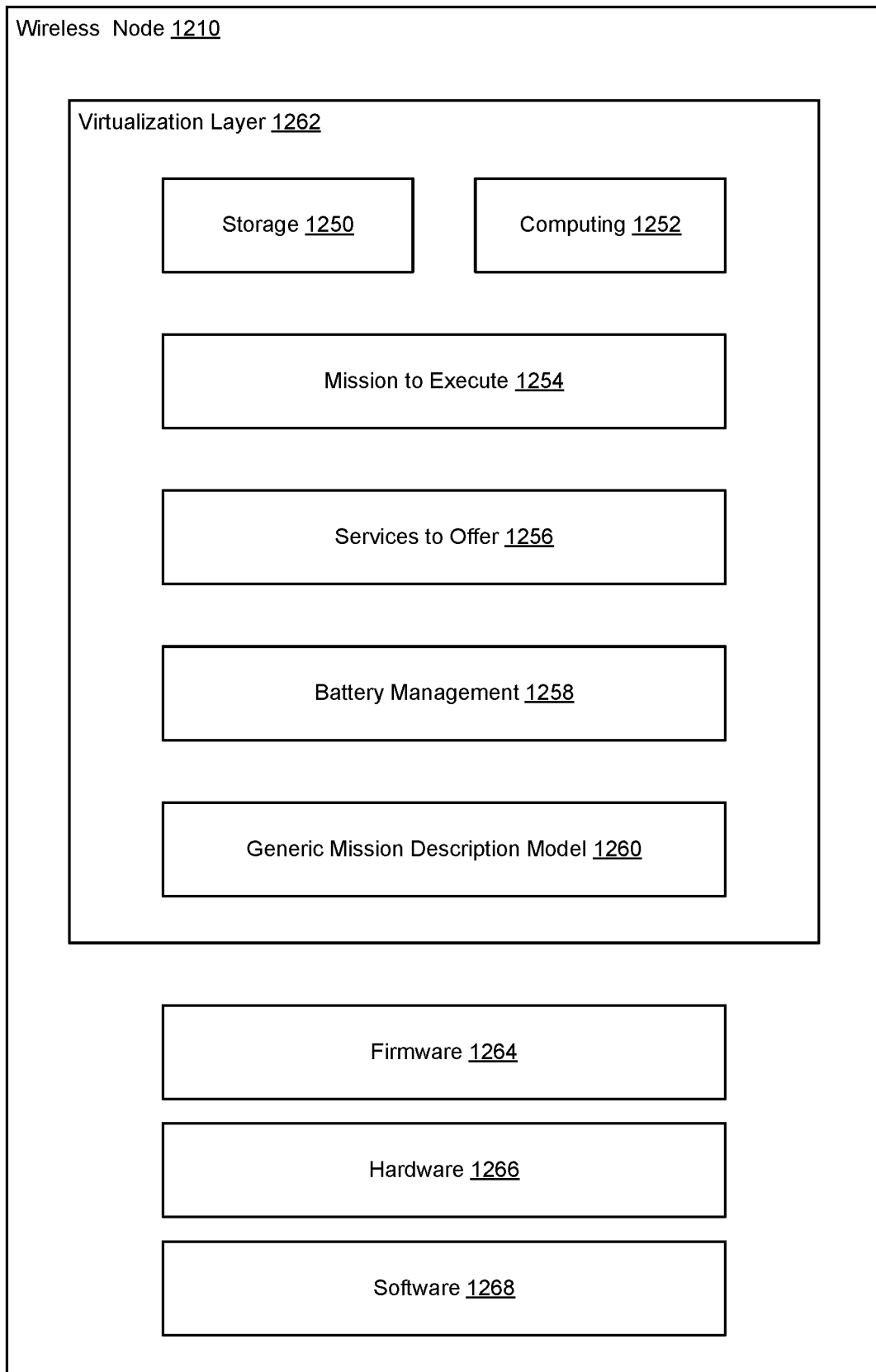
FIG. 12 is a schematic showing an alternative view of the functionality of a tape node.

FIG. 12 is a schematic showing an alternative view of the functionality of a wireless node 1210. The tape nodes 1110, 1130 are each an embodiment of the wireless node 1210. The wireless node 1210 itself may be an embodiment of the adhesive tape platform described above with respect to FIGS. 1-6C or it may be an embodiment of a gateway device or another device node in the IoT system 400, according to some embodiments. The wireless node 1210 includes storage functionality 1250 (e.g., non-volatile memory) and computing functionality 1252. The wireless node 1210 includes a mission to execute 1254, which defines the roles and goals of that wireless node 1210. Other tape nodes may have different missions to execute 1254, and have different resources (e.g., hardware, capabilities, and battery resources, for example). The wireless node 1210 also has services to offer 1256, which defines services and functions that the wireless node 1210 may offer to other nodes of the IoT system 400. The wireless node 1210 may also include battery management 1258 that manages use of battery power by the wireless node 1210. For example, the battery management 1258 allows the wireless node 1210 to maximize its life by adjusting functionality and use of resources to conserve battery power when necessary such that the wireless node 1210 completes its mission to execute 1254. The wireless node 1210 also includes a generic description model 1260 that defines operation of the wireless node 1210 to meet its mission to execute 1254. These functions are implemented by a virtualization layer 1262 that abstracts the functions from the specific hardware 1266 of the tape node. For example, the virtualization layer 1262 may implement a virtual machine that is common to all nodes of the tracking system 400, thereby allowing the function to be implemented by any of the nodes. The wireless node 1210 may also include firmware that is specific to the hardware 1266 and that implements the virtualization layer 1262.

The wireless node 1210 also includes firmware 1264 that configures the wireless node 1210 for performing functions using one or more hardware components 1266 of the wireless node 1210. The firmware 1264 may include firmware for the wireless node 1210 itself, as well as individual firmware for one or more of the hardware components 1266 of the wireless node 1210. The firmware may include a version number, indicating a particular version out of a plurality of available firmware versions. The wireless node 1210 also includes software 1268 that is installed on a memory or storage 1250 of the wireless node 1210 that a processor of the wireless node 1210 executes to perform various computational functions.

In conventional computing architectures, intelligence only occurs within a server or within edge nodes, and the end nodes typically collect and send sensor data to the server or edge nodes for processing and decision making. However, in the IoT system 400, a wireless node 1210 may include distributed intelligent software that causes the wireless node 1210 to operate as a master, following its mission to execute 1254, and delegating tasks and actions as needed, according to some embodiments.

In one example of operation, wireless node 1210 is attached to an asset (e.g., a package) being shipped to a customer location. The wireless node 1210 includes a manifest defining its intended journey, and its mission to execute 1254 is to monitor handling of the asset and to ensure it reaches its destination on schedule. In this example, as the asset is being moved through a warehouse, it inadvertently falls from a conveyer belt when moving towards a transport vehicle. The wireless node 1210, following its mission to execute 1254, detects the fall of the asset and that it has stopped moving. The wireless node 1210 may then determine that, because it is not moving and that it is not on the transport vehicle, it has a problem. Accordingly, the wireless node 1210 communicates with a nearby client device 1230 (e.g., of a supervisor) at the warehouse to indicate the problem. The supervisor may then use the client device 1230 to locate the errant asset and ensures that it gets loaded onto the transport vehicle. In this scenario, the central database and controller 1220 was not involved in detecting or resolving the problem, but may receive status reports indicating the events. Specifically, the mission to execute 1254 causes the wireless node 1210, acting as the master, resolve its uses locally, thereby getting faster results and saving battery power (through using low-power communications).

The identity and role of a tape node in the IoT system 400 corresponds to the components of the wireless node 1210. When the Tape Node B assumes the identity and role of the Tape Node A, in the example of FIG. 11, the Tape Node B copies from Tape Node A portions of or completely copies a selected combination of aspects of the Tape Node A from those shown in FIG. 12 for the wireless node 1210. The aspects may include some combination of the mission to execute 1254, the services to offer 1256, the battery management 1258, the generic mission description model 1258, portions of the software 1268, and other aspects of the Tape Node A. In some further embodiments, the Tape Node B also copies portions of or completely copies from Tape Node A the firmware 1265. In some embodiments, the Tape Node B copies at least the mission to execute 1254 from the Tape Node A. The configuration file Tape Node B receives from Tape Node A, in the example of FIG. 11, includes programmatic code corresponding to the selected aspects that Tape Node B copies from Tape Node A in order to take over and assume the identity and role of Tape Node B during Tape Node B's configuration. When viewed by other nodes of the system 400, the Tape node B will appear to be the same wireless node 1210 as the Tape Node B, according to some embodiments.

FIG. 13 is a flow chart showing steps for an example method 1300 of configuring a wireless node of the IoT system for fast replacement, according to some embodiments. The wireless node is an IoT device of the IoT system 400, according to some embodiments. In further embodiments, the wireless node is an embodiment of an adhesive tape platform, i.e., a tape node. A first wireless node, referred to herein as "wireless node A," is initially installed on an asset and initialized 1310 with a first configuration file, referred to herein as "configuration file A." The configuration file A includes all necessary parameters, portions of software, portions of firmware, and identifiers necessary for configuring wireless node A to function according to its mission to execute 1254. The configuration file A also includes programmatic code which identifies and/or describes the mission to execute 1254 itself. For example, if the mission to execute 1254 for wireless node A is to monitor vibration of an asset for a period of time using a vibration sensor of wireless node A, the configuration file A includes programmatic code that describes the mission to monitor vibration for the asset, as well as all parameters, software 1268, firmware 1264 (which may include changes to firmware or a set of firmware versions that need to be installed on the wireless node A) in order to successfully perform the mission.

In some embodiments, at initialization 1310, the wireless node A receives the configuration file A from another node of the IoT system 400. For example, a client device of a user that is installing the wireless node A may establish a wireless communication connection with the wireless node A at the time of installation and transmit the configuration file A or portions of the configuration file A to the wireless node A. In other examples, the wireless node A searches for another wireless node after it has been powered on. Once the wireless node A has successfully discovered another wireless node and established a wireless communication connection, the wireless node A requests a configuration file, and the connected wireless node provides the configuration file A, in response. In other embodiments, the wireless node A is preconfigured with the configuration file A in its memory or storage at the time it is assembled or manufactured.

After some time operating according to its configuration file A, the wireless node A determines that it is in need of imminent replacement and indicates 1320 that it needs replacement. The wireless node A may determine that it is in need of imminent replacement based on its battery level being below a threshold level, for example. In other examples, the wireless node makes the determination based on another performance indicator (e.g., received signal strength, transmitted signal strength, return signal strength, or an operational time or lifetime) for the wireless node being below or above a threshold level. The indication 1320 may include using a display to visually indicate on the wireless node A the need for replacement, as with the Tape Node 1110, in FIG. 11. In some embodiments, the indication includes the wireless node A transmitting a corresponding wireless signal to other wireless nodes of the IoT system 400 that indicates the need for replacement. In further embodiments, the wireless signal is received by another wireless node of the IoT system 400, and the other wireless node, in response, notifies a server of the IoT system 400.

In response to the indication 1320 that the wireless node A needs to be replaced, a human operator installs 1330 a second wireless node, referred to herein as "wireless node B," on the same asset as wireless node A in proximity to wireless node A. In further embodiments, the human operator installs 1330 the wireless node B within a threshold distance (e.g., within 1 foot) from the wireless node A. If the wireless node A and the wireless node B are both embodiments of the adhesive tape platform, the human operator may adhesively attach the wireless node B to the asset.

The human operator installs 1330 wireless node B based on instructions received from the IoT system 400 to initiate the replacement process of wireless node A. The instructions may include a location of wireless node A, an identifier associated with wireless node A, a type of wireless node that corresponds to wireless node B, instructions on a procedure for installing wireless node B, instructions on where to install wireless node B on the asset, a time when the human operator should install wireless node B, some other instructions, or some combination thereof. The human operator may receive the instructions on a client device which displays the instructions on an app of the client device. The app may be configured to assist in other steps of the replacement process 1300. The app may do so in the background without the knowledge or input from the human operator, according to some embodiments. The client device may receive the instructions from a server of the IoT system 400 via cellular communications, through an internet connection, or via some other network connection.

Alternatively, the human operator's client device may receive the indication 1320 from the wireless node A directly via a wireless communication connection with the wireless node A. The wireless node A may transmit the indication 1320 to any nearby client device that it can find. The app on the client device may be configured to search for any indication signals transmitted from wireless nodes that are within a communication range of the client device. The app may be configured to continuously or periodically perform this search in the background of the client device, according to some embodiments. When the human operator with the client device passes within the communication range of the wireless node A while the wireless node A is transmitting the indication 1320, the client device receives the indication 1320 and displays instructions to the human operator via the app to perform the installation 1330 of the wireless node B, in response.

In some embodiments, the human operator optionally provides a stimulus 1340 to at least one of the wireless node A and the wireless node B to trigger a discovery process for the wireless node A and the wireless node B, as described above with respect to FIG. 11. For example, the stimulus may include providing and input on a user interface of the app on the client device to initiate the discovery process for the two wireless nodes, after which the client device transmits a trigger signal for both the wireless node A and the wireless node B to initiate the discovery process. In other embodiments, the tape node A and the tape node B automatically initiate a discovery process, also referred to herein as a "discovery protocol," without any actions performed by the human operator after the installation 1330 of the wireless node B.

Wireless node A and tape node B then perform a discovery protocol 1350. The discovery protocol includes the wireless node A searching for a nearby wireless node, e.g., wireless node B, to replace the wireless node A. The discovery protocol also includes the wireless node B searching for a nearby wireless node, e.g., wireless node A, to receive a configuration file from in order to complete the wireless node B's configuration. The wireless node A broadcasts its presence to the wireless node B and informs the wireless node B that the wireless node A needs to be replaced and has an available configuration file for transmission. The wireless node B broadcasts its presence to the wireless node A and informs the wireless node A that the wireless node B is in need of receiving a configuration file. Under these conditions, the wireless node A and the wireless node B agree to perform the configuration for fast replacement and establish a wireless communication connection for the next steps. The discover process is discussed in further detail below with respect to FIGS. 14A-14B.

The wireless node A transmits configuration file A to wireless node B, and wireless node B copies 1360 the received configuration file A to its storage or memory. The wireless node B completes its configuration of itself based on the received configuration file A. Upon successfully configuring itself based on the received configuration file A, the wireless node B confirms 1365 to the wireless node A that the configuration was successful and that the wireless node B is now configured to fully replace wireless node A. Then, the wireless node A ceases functioning, and the wireless node B begins functioning 1370 according to wireless node A's former role and identity in the IoT system 400, based on the configuration file A. Thus the replacement process is complete, and the wireless node B has successfully replaced wireless node A without any manual configuration or programming by the human operator. Finally, the human operator optionally removes 1380 the wireless node A from the asset at a later time.

In some further embodiments, a server of the IoT system 400 instructs the human operator, via an app on the human operator's client device, to install the wireless node B 1330 within a time window. The time window may include a range of times (e.g., between 3 PM and 4 PM on a certain day) during which the replacement process 1300 will be carried out. In some examples, the wireless node A and the wireless node B are configured to discover each other during the time window. For example, the wireless node B may be configured to initiate its discovery process automatically at the start of the time window. If the wireless node A and the wireless node B fail to discover each other during the time window, then the replacement process 1300 is interrupted, and the human operator is instructed to install another replacement wireless node (e.g., a wireless node C) to replace wireless node A or to reinstall wireless node B and restart the discovery process.

Although FIG. 11 shows a replacement process for two tape nodes, the same or a similar replacement process applies to wireless nodes of the IoT system 400 that do not have the adhesive tape product form-factor, according to some embodiments. For example, the same process may be carried out for a gateway device that is plugged into an electrical outlet or a tracking device that has a rigid form factor. The example replacement process illustrated in FIG. 11 may be carried out for replacing any wireless node in the IoT system 400.

Discovery Process for Fast Replacement of Wireless Nodes

In response to a first wireless node, i.e., wireless node A, that is deployed in the field determining that the first wireless node is need of imminent replacement, the first wireless node may begin a discovery process to search for any other available, nearby wireless nodes that can replace the first wireless node. The first wireless node may be operating in the field to support the IoT system 400. For example, the first wireless node may be attached to an asset and configured to track the location and/or the condition of the asset, periodically reporting location data on the associated asset to the IoT system 400. When a second wireless node, i.e., wireless node B, is deployed in the field for the first time for replacement of another wireless node, the wireless node B requires the receiving of a configuration file, in order to complete its own configuration and begin operating with a role and identity. As part of its own respective discovery process, the second wireless node searches for another wireless node of the IoT system 400 that can provide a configuration file to the second wireless node after its initial deployment in the field. If the first wireless node and the second wireless node discover each other during their respective discovery processes, the second wireless node accepts a configuration file wirelessly transmitted from the first wireless node, and the second wireless node replaces the first wireless node in the IoT system 400. In some embodiments, wireless node A and wireless node B are each tape nodes, such as the tape nodes shown in FIG. 11.

FIGS. 14A-14B are flow charts each showing steps for an example discovery process for first wireless node deployed in the field, i.e., wireless node A, and a second wireless node, i.e., wireless node B, replacing the first wireless node, according to some embodiments. FIG. 14A shows a flow chart for an example discovery process 1401 where the wireless node A continuously searches 1410 for a nearby replacement wireless node after the discovery process is initialized. The search 1410 may include transmitting a signal broadcasting the availability of a configuration file for replacing wireless node A. The search 1410 may also include activating a receiver portion of a wireless communication system to receive a wireless signal from a nearby wireless node that is requesting a configuration file. The wireless node A may continuously search for a replacement wireless node until it successfully discovers and pairs a replacement wireless node. In some embodiments, the wireless node A may continuously search for the replacement wireless node until its battery is depleted. In other embodiments, the wireless node A may conserve its battery by continuously searching for a replacement wireless node for a period of time. After the period of time has expired and if the wireless node A has not found a replacement wireless node, the wireless node A may time out its discovery process, discontinuing its search, and re-attempt the search at a later time. The wireless node A may begin the search 1410 in response to a stimulus, as described above with respect to FIGS. 11 and 13, or in response to first determining that the wireless node A needs imminent replacement.

A wireless node B in the vicinity of the wireless node A periodically transmits 1412 a request to receive a configuration file from a nearby wireless node of IoT system 400 for completing the configuration of wireless node B. The frequency with which the wireless node B transmits 1412 the request may correspond to a timeout period of the wireless node A's search 1410, according to some embodiments. Alternatively, the frequency with which the wireless node B transmits 1412 the request may correspond to an amount of time that the wireless node A is capable of operating while searching 1410 for a replacement wireless node before it depletes its battery. The transmitted request may include information on the wireless node B that can be used to determine if the wireless node B is a suitable wireless node for replacing a wireless node that receives the request. The information, for example, may include a location of the wireless node B, a manifest of the hardware components of wireless node B, a manifest of software and firmware currently installed on the wireless node B, an identifier associated with wireless node B, such as a hardware identifier or a unique identifier, some other information on wireless node B, a distance of wireless node B from the nearby wireless node, or some combination thereof. The wireless node B may begin the transmission 1412 in response to a stimulus, as described above with respect to FIGS. 11 and 13, or in response to first being activated, powered on, or initialized.

When the search 1410 of the wireless node A and the transmission 1412 of the wireless node B overlap, the wireless node A receives the request from wireless node B and confirms 1414 that the tape node B will receive the configuration file A from wireless node A. To confirm 1414 tape node B as the appropriate recipient of configuration file A, the wireless node A may determine that wireless node B is a suitable replacement based on information received as part of the request transmitted 1412 by wireless node B. In some embodiments, both the wireless node A and wireless node B must reach a consensus on the replacement, before the wireless node A and the wireless node B complete the configuration for replacing wireless node A. The wireless node A may need to do check the information received form wireless node B to make sure that the wireless node B is compatible with the configuration file A. The wireless node A may also need to check to make sure the wireless node B is capable of performing the same tasks and functions that wireless node A performed as part of its role and identity in the IoT system 400.

After the wireless node A and the wireless node B have discovered each other, the wireless node A transmits 1416 the configuration file A to wireless node B. In some embodiments, the wireless node A modifies the configuration file A based on information received from wireless node B. The wireless node A may modify the configuration file A to be compatible with the wireless node B. The wireless node B receives the configuration file A 1416, copies the received configuration file A to its own storage or memory, and completes its own configuration process based on the received configuration file A. The rest of the replacement process proceeds, according to steps 1360, 1365, 1370, and 1380 of FIG. 13, according to some embodiments.

FIG. 14B shows a flow chart for an alternative example discovery process 1402 where the wireless node B continuously transmits 1420 a request for a nearby wireless node to provide a configuration file after the discovery process is initialized. The wireless node B may continuously transmit 1420 the request until the wireless node B receives a return signal confirming from a nearby wireless node that the nearby wireless node is able to provide a configuration file to the wireless node B. In some embodiments, the wireless node B continuously transmits the 1420 request for a period of time, and if the wireless node B does not receive a return signal confirmation in the period of time, the wireless node B times out its transmission, pausing the transmission until a later time when the wireless node B will reattempt to find a wireless node with an available configuration file. The period of time may be set based on an available amount of energy stored on the wireless node B's battery. The wireless node B may begin the transmission 1420 in response to a stimulus, as described above with respect to FIGS. 11 and 13, or in response to first being activated, powered on, or initialized.

While the wireless node B is continuously transmitting the request, the wireless node A, which includes the configuration file A, periodically searches 1422 for a replacement tape node to receive its configuration file A. The search 1422 of wireless node A may include activating a receiver portion of a wireless communication signal to receive the request transmitted 1420 from the wireless node B or from another wireless node in need of a configuration file. The wireless node A may search with a frequency that corresponds to the timeout period of the wireless node B, in some embodiments. The frequency may alternatively or additionally be based on an amount of energy remaining in the battery of wireless node A. The wireless node A may begin the search 1422 in response to a stimulus, as described above with respect to FIGS. 11 and 13, or in response to first determining that the wireless node A needs imminent replacement.

When the search 1422 of the wireless node A and the transmission 1420 of the wireless node B overlap, the wireless node A receives the request from wireless node B and confirms 1414 that the tape node B will receive the configuration file A from wireless node A. After the wireless node A and the wireless node B have discovered each other, the wireless node A transmits 1416 the configuration file A to wireless node B. In some embodiments, the wireless node A modifies the configuration file A based on information received from wireless node B. The wireless node A may modify the configuration file A to be compatible with the wireless node B. The wireless node B receives the configuration file A 1416, copies the received configuration file A to its own storage or memory, and completes its own configuration process based on the received configuration file A. The rest of the replacement process proceeds, according to steps 1360, 1365, 1370, and 1380 of FIG. 13, according to some embodiments. The steps 1414 and 1416 in FIG. 14B occur similarly or identically to the steps 1414 and 1416 in FIG. 14A.

FIG. 15 is a flow chart showing steps for an example method 1500 of configuring a wireless node of the IoT system for fast replacement of an existing wireless node in an IoT system 400 by using an intermediary device which coordinates the configuration, according to some embodiments. In the example of FIG. 15, wireless node A is a wireless node of the IoT system 400 that is in need of imminent replacement and a wireless node B is installed and configured to replace the wireless node A in the IoT system 400.

Wireless node A is installed on an asset and initialized 1510 with configuration file A. Wireless node A notifies 1520 an intermediary device (e.g., gateway device or client device) that imminent replacement is necessary. The intermediary device may be located nearby the wireless node A and is configured to communicate with wireless nodes of the IoT system 400. According to some embodiments, the intermediary device may be located within a threshold distance from the wireless node A. The threshold distance may correspond to a wireless communication range for a wireless communication protocol being used to communicate between the intermediary device and the wireless node A, in some further embodiments. The intermediary device may be gateway device that is configured to communicate across multiple communication ranges using a plurality of wireless communication protocols and systems, according to some embodiments. The intermediary device may be a line-powered device that is plugged into an electrical outlet to draw electrical power or may be connected to a power supply. In such embodiments, the intermediary device may not be constrained by battery life limitations when coordinating the configuration of wireless node B in replacing wireless node A. In response, the intermediary device notifies a server of the IoT system 400 or a client device associated with a nearby human operator to issue a replacement wireless node for the wireless node A. In response, a human operator installs wireless node B on the asset within proximity of wireless node A. In some embodiments, the wireless node B is installed within a threshold distance from wireless node A.

After the installation, the wireless node B is activated or powered on, and the wireless node B notifies 1540 the intermediary device that it is ready to receive a configuration file. In response to receiving both the notification 1520 from the wireless node A and the notification 1540 from the wireless node B, the intermediary device syncs 1550 the times of wireless node A and wireless node B. The intermediary device may sync the times of wireless node A and the wireless node B by transmitting a universal time stamp (e.g., a time stamp provided by the intermediary device that is in UTC time which acts as a ground truth for time for the wireless node A and the wireless node B) to each of the wireless node A and the wireless node B after establishing a wireless communication connection with both the wireless node A and the wireless node B. Each of the wireless node A and the wireless node B syncs their internal clocks to the received universal time stamp. The wireless node A and the wireless node B are then synced to each other within a margin of error, with respect to time, based on both the wireless nodes being synced to the universal time stamp received from the intermediary device.

The intermediary device then instructs 1550 the wireless node A and the wireless node B to discover each other at a specified time (e.g., 8:00 PM UTC). At the specified time, the wireless node A and the wireless node B each initiate their respective discovery processes and discover 1570 each other at the specified time or at a time after the specified time, and the wireless node A transfers the configuration file A to wireless node B after discovering wireless node B. The discover process may follow the steps described above with respect to FIGS. 14A-14B. Similarly, the wireless node A and the wireless node B may proceed to complete the configuration of wireless node B and the replacement of wireless node A following the steps 1360, 1365, 1370, and 1380, according to some embodiments.

Figure 15B:
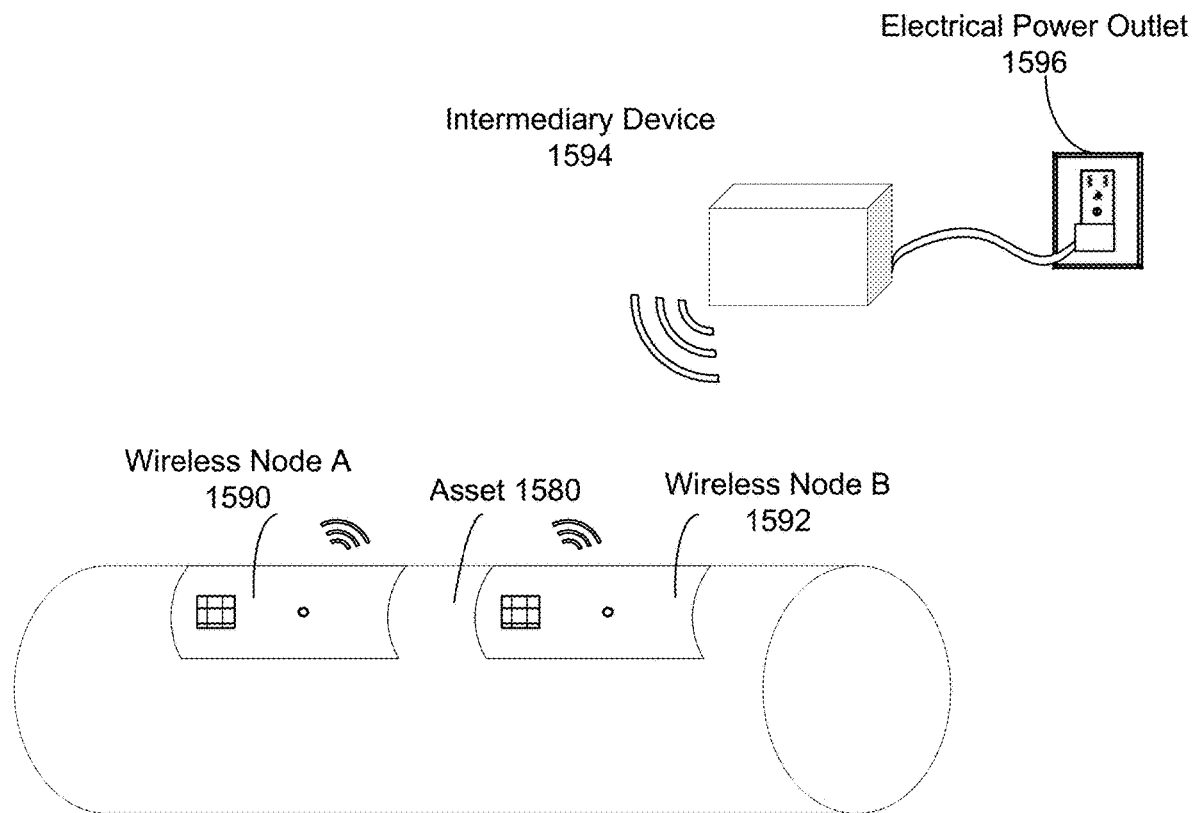
FIG. 15B shows an example environment including a first wireless node, a second wireless node being configured to replace the first wireless node, and an intermediary device for coordinating the configuration of the second wireless node by the first wireless node, according to some embodiments.

FIG. 15B shows an example environment including a first wireless node 1590, i.e., wireless node A, a second wireless node 1592, i.e., wireless node B, being configured to replace the first wireless node 1590, and an intermediary device 1594 for coordinating the configuration of the second wireless node by the first wireless node, according to some embodiments. In some embodiments, the intermediary device 1594 is a gateway node of the IoT system 400 that is configured to wirelessly communicate with one or more wireless nodes of the IoT system 400. The intermediary device 1594 includes one or more wireless communication system for communicating over one or more wireless communication protocols (e.g., Bluetooth, Zigbee, LoRa, WiFi, cellular, etc.). In an example, the intermediary device 1594 includes both a Bluetooth for short-range communication with the wireless node A and the wireless node B and a cellular communication system (e.g., 2G, 3G, LTE, 4G, or 5G cellular communication system) for communication with one or more server(s) 404 of the IoT system 400. The intermediary device 1594, in the example of FIG. 15B, is a line-powered device that is plugged into and drawing electrical power from an electrical power outlet 1596. However, in other embodiments, the intermediary device 1594 may be powered by a battery or another power supply. For example, the intermediary device 1594 may be a solar-powered device. In other embodiments, the intermediary device 1594 is an embodiment of an adhesive tape platform, a client device such as a smartphone, or a device with a different form factor.

The intermediary device 1594 may be configured to periodically or continuously receive wireless signals from the wireless node A and the wireless node B, in order to detect when wireless node A and the wireless node B are in need of respective services. As described above, with respect to FIG. 15A, the intermediary device may be configured to receive the signals indicating that wireless node A is in need of imminent replacement and that the wireless node B is in need of a configuration file to complete its configuration. In order to synchronize the wireless node A and the wireless node B and aid each of the wireless nodes in their respective discovery processes, the intermediary device 1594 may frequently activate or continuously activate its wireless communication system (e.g., an onboard Bluetooth communications system) to receive the notification signals in the steps 1520, 1540 of the example method 1500 from the wireless node A and the wireless node B without missing the notification. If the intermediary device 1594 is a line-powered device it may do so without the downside of depleting power reserves in a battery, according to some embodiments. The intermediary device may further receive data and instructions from the server(s) of the IoT system 400 for coordinating the configuration process of wireless node B. For example, the server(s) may instruct the intermediary device 1594 to search for wireless devices with specific identifier, unique identifiers, or hardware identifiers that correspond to wireless node A and the wireless node B. The server(s) may do this when the wireless node B has been specifically deployed and installed to replace wireless node B. Doing so may ensure that an incorrect or different wireless node does not replace wireless node A, by mistake.

Figure 16A:
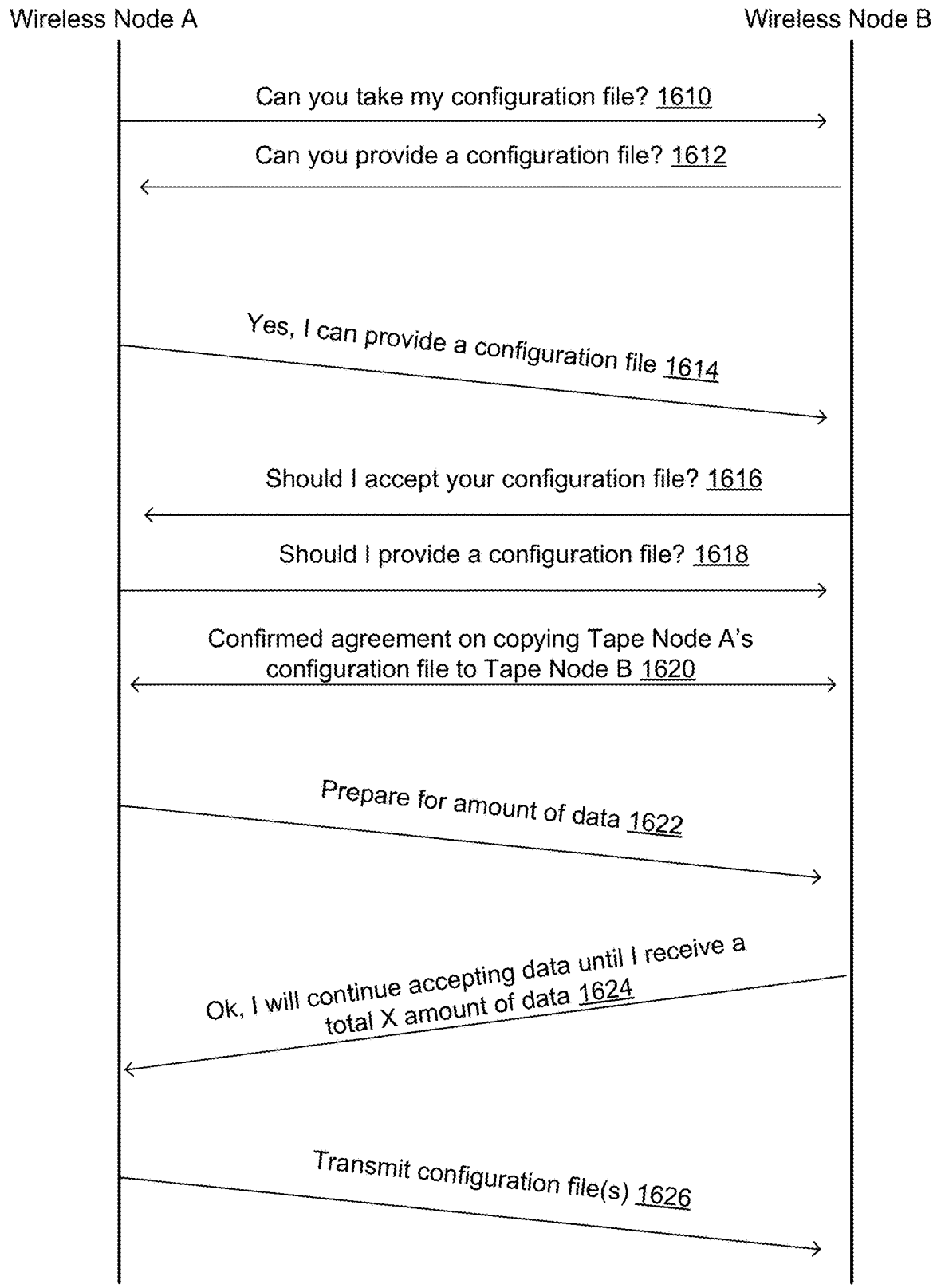
FIGS. 16A-16B are diagrams illustrating a dialog between a tape node A and a tape node B during a configuration process in which tape node B is configured to replace tape node A, according to some embodiments.
Figure 16B:
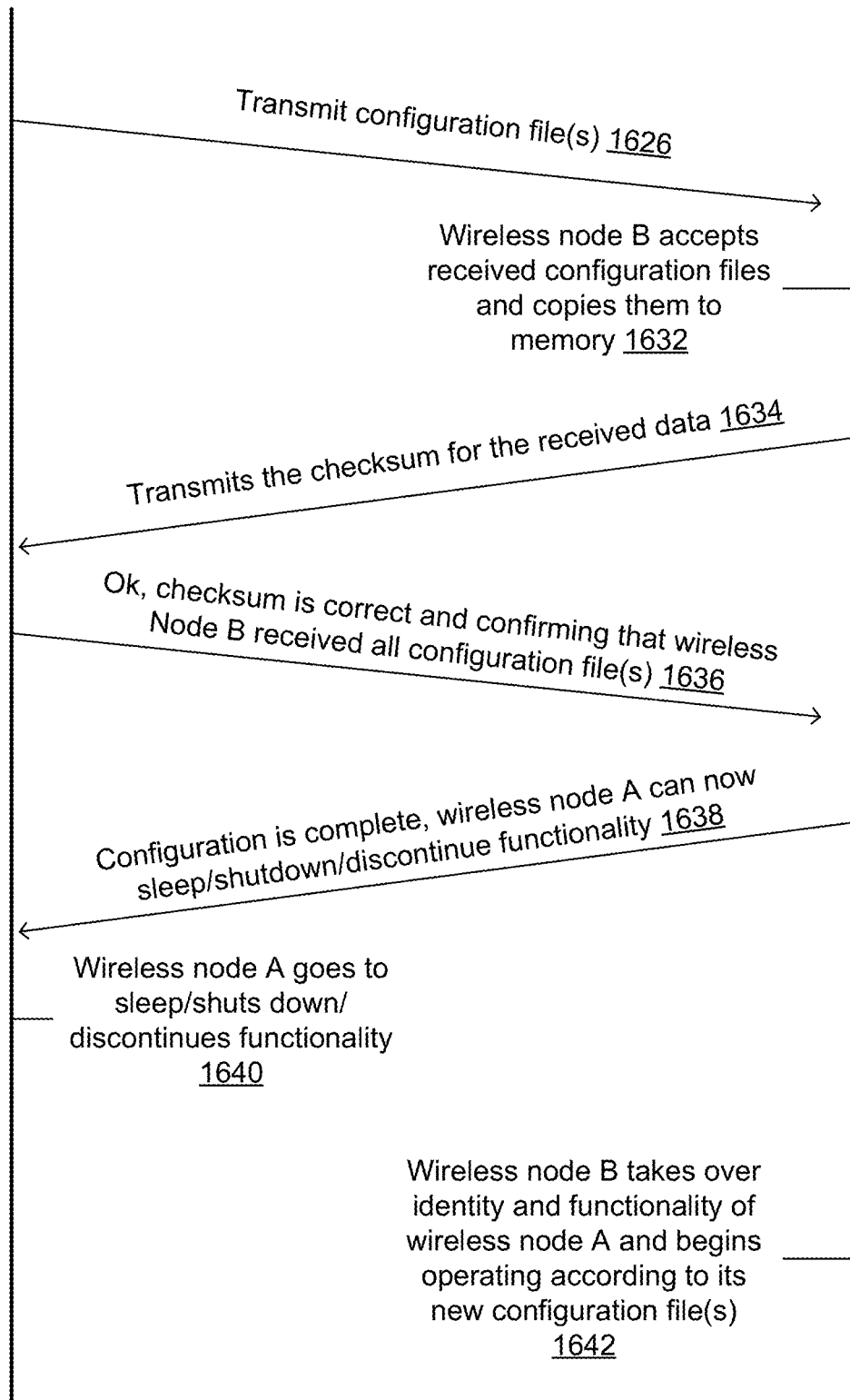

FIG. 16A-16B are diagrams illustrating a dialog between a wireless node A and a nearby wireless node B during a configuration process in which tape node B is configured to replace tape node A, according to some embodiments. The dialog describes interactions between the wireless node A and the wireless node B that occur over a wireless communication connection (e.g., a Bluetooth connection) during a configuration process in which wireless node B is configured to replace wireless node A in the IoT system 400.

FIG. 16A shows a first part of the dialog between wireless node A and wireless node B. The wireless node A queries 1610 the wireless node B on whether the wireless node B is able to accept a configuration file, i.e., configuration file A, wireless node A. The wireless node B simultaneously or at a time within a threshold period of time from the wireless node A's query requests 1612 a configuration file 1612. In some embodiments, the request 1612 from wireless node B is sent in response to receiving the query 1610 from the wireless node A. In response to receiving the request 1612 from the wireless node B, the wireless node A confirms 1614 that it can provide its configuration file to wireless node B.

The wireless node B and The wireless node A may each determine 1616, 1618 whether wireless node B is a suitable replacement for wireless node A, before confirming 1614. The wireless node A may determine 1618 that wireless node B is suitable based on information received from wireless node B describing the capabilities and hardware components of wireless node B, according to some embodiments. The wireless node B may determine 1616 that wireless node A is a suitable node to receive a configuration file based on information received from the wireless node A describing the capabilities of wireless node A, the role and identity of wireless node A in the IoT system 400, and the hardware components of wireless node A. The wireless nodes may further determine that wireless node B is suitable for replacing wireless node A based on a distance of wireless node B from wireless node A being less than a threshold distance. The distance may be determined based on received signal strength of the wireless communication between wireless node A and wireless node B.

Both wireless node A and wireless node B come to consensus 1620 agreeing that wireless node B should copy the configuration file A from wireless node B. The wireless node A instructs 1622 wireless node B to prepare to receive data of a specific amount (e.g., 50 megabytes of data), the amount corresponding to the size of the configuration file A. The wireless node B confirms 1624 to wireless node A that it will continue to receive data over the wireless communication connection between the two wireless nodes until the specific amount of data is received. In response, the wireless node A transmits 1626 the configuration file to the wireless node B.

FIG. 16B shows a second part of the dialog between wireless node A and wireless node B, continuing where FIG. 16A left off with the transmitting 1626 of the configuration file A from wireless node A to wireless node B. The configuration file may include a plurality of configuration files, according to some embodiments. The wireless node B accepts 1632 the received configuration file and copies the configuration file to its own storage or memory. The wireless node B generates a checksum of the copied configuration file and transmits 1634 the checksum to the wireless node A. The wireless node A compares the received checksum from wireless node B to the checksum for the original configuration file A to confirm that the wireless node B correctly received the configuration file A. If the received checksum matches the checksum for the original configuration file A, the wireless node A sends a confirmation n1636 to the wireless node B. The wireless node B responds by confirming 1638 that configuration of wireless node B is complete and instructing the wireless node A to sleep, shutdown, discontinue its functionality, deplete its battery, perform additional tasks, or some combination thereof. The wireless node A, in response, goes to sleep, shuts down, discontinues its functionality, or some combination thereof 1640. The wireless node B then takes over the identity and role of the wireless node A and begins operating 1642, according to the received configuration file A.

Figure 17:
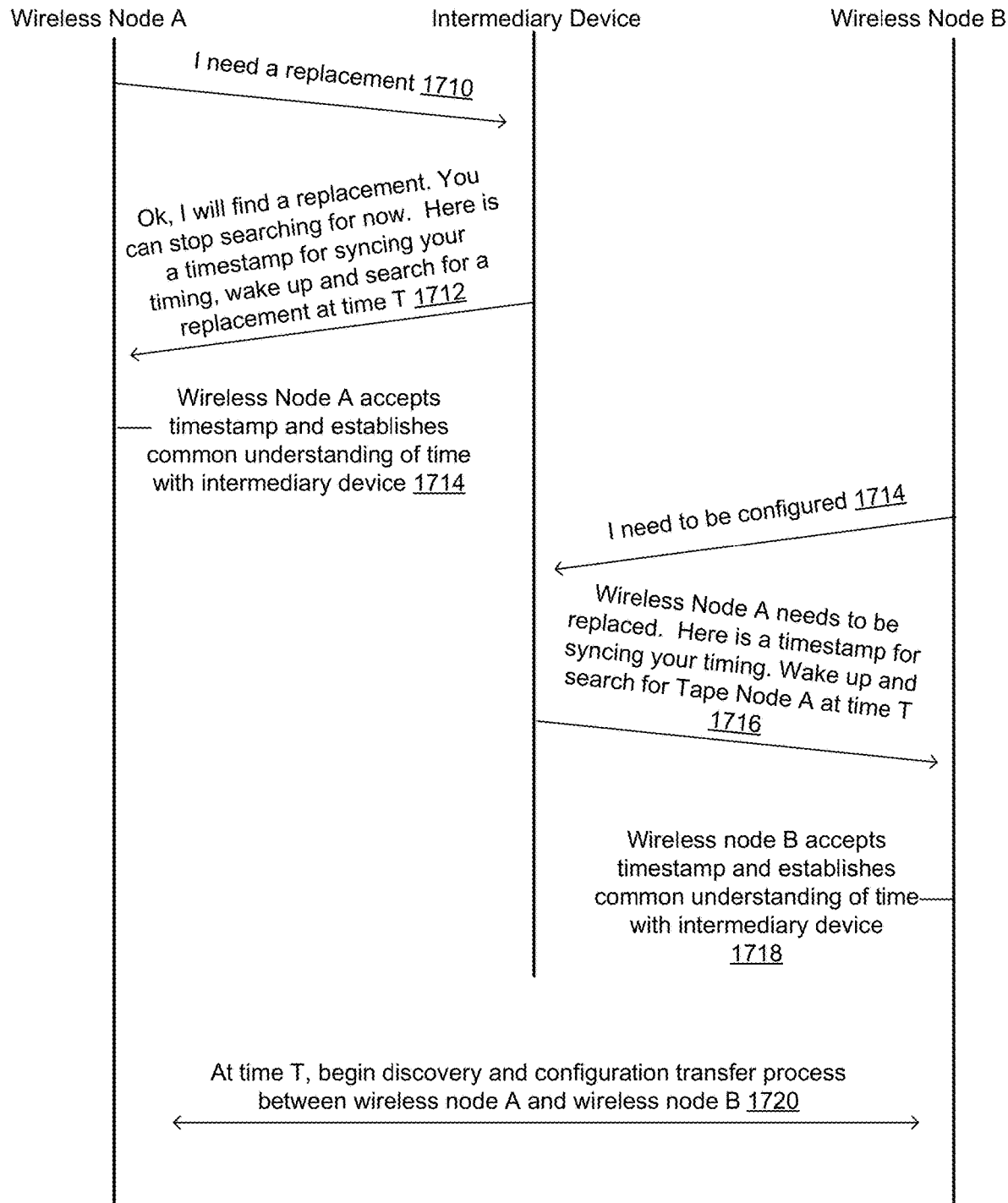
FIG. 17 is a diagram illustrating a dialog between a tape node A, a tape node B, and an intermediary device during a configuration process in FIG. 18 shows an example embodiment of computer apparatus, according to some embodiments.

FIG. 17 is a diagram illustrating a dialog between a wireless node A, wireless node B, and an intermediary device during a configuration process in which wireless node B is configured to replace wireless node A, according to some embodiment. The intermediary device is a device in proximity to both the wireless node A and the wireless node B which is configured to wirelessly communicate with each of the wireless node A and the wireless node B. The dialog describes interactions between the wireless node A, the wireless node B, and the intermediary device that occur over a wireless communication connection (e.g., a Bluetooth connection) during a configuration process in which wireless node B is configured to replace wireless node A in the IoT system 400. The intermediary coordinates the communications between wireless node A and the wireless node B to ensure that the two are able to wirelessly connect to each other within a specific time range in order to transfer a configuration file from wireless node A to wireless node B.

The wireless node A first informs 1710 the intermediary device 1710 that the wireless node A is in need of imminent replacement by a new node of the IoT system 400. The intermediary device confirms 1712 that it has received the notification 1710 from the wireless node A and provides the wireless node A a timestamp (e.g., a universal time stamp) to sync its internal clock and timing to the intermediary device's clock and timing. The intermediary device also assigns a time T at which time the wireless node A is instructed to activate its wireless communication system and search for a replacement wireless node to receive its configuration file A. The wireless node A accepts the timestamp 1714 and syncs its internal time to that of the intermediary device.

Later, a wireless node B near the wireless node A requests 1714 that the intermediary device assign a wireless node to provide a configuration file to the wireless node B. The intermediary device informs 1716 that the wireless node A needs to be replaced and that the wireless node A will wake up at time T to search for a replacement wireless node. The intermediary device provides a timestamp 1716 to sync the wireless node B's internal clock and timing to the internal clock and timing of the intermediary device and to the wireless node A. The wireless node B accepts 1718 the timestamp and syncs its time to that of the intermediary device based on the received timestamp.

At the time T, each of the wireless node A and the wireless node B wake up their wireless communication systems and search for each other. The wireless nodes may go on to complete a discovery and configuration process for wireless node B, according to the examples discussed above with respect to FIGS. 16A and 16B.

In all of the above examples, the wireless node A and the wireless node B may be embodiments of an adhesive tape platform but are not limited to those embodiments. Similarly, the intermediary device may be an embodiment of an adhesive tape platform, a gateway device, a client device, a server, or some other device.

Computer Apparatus

Figure 18:
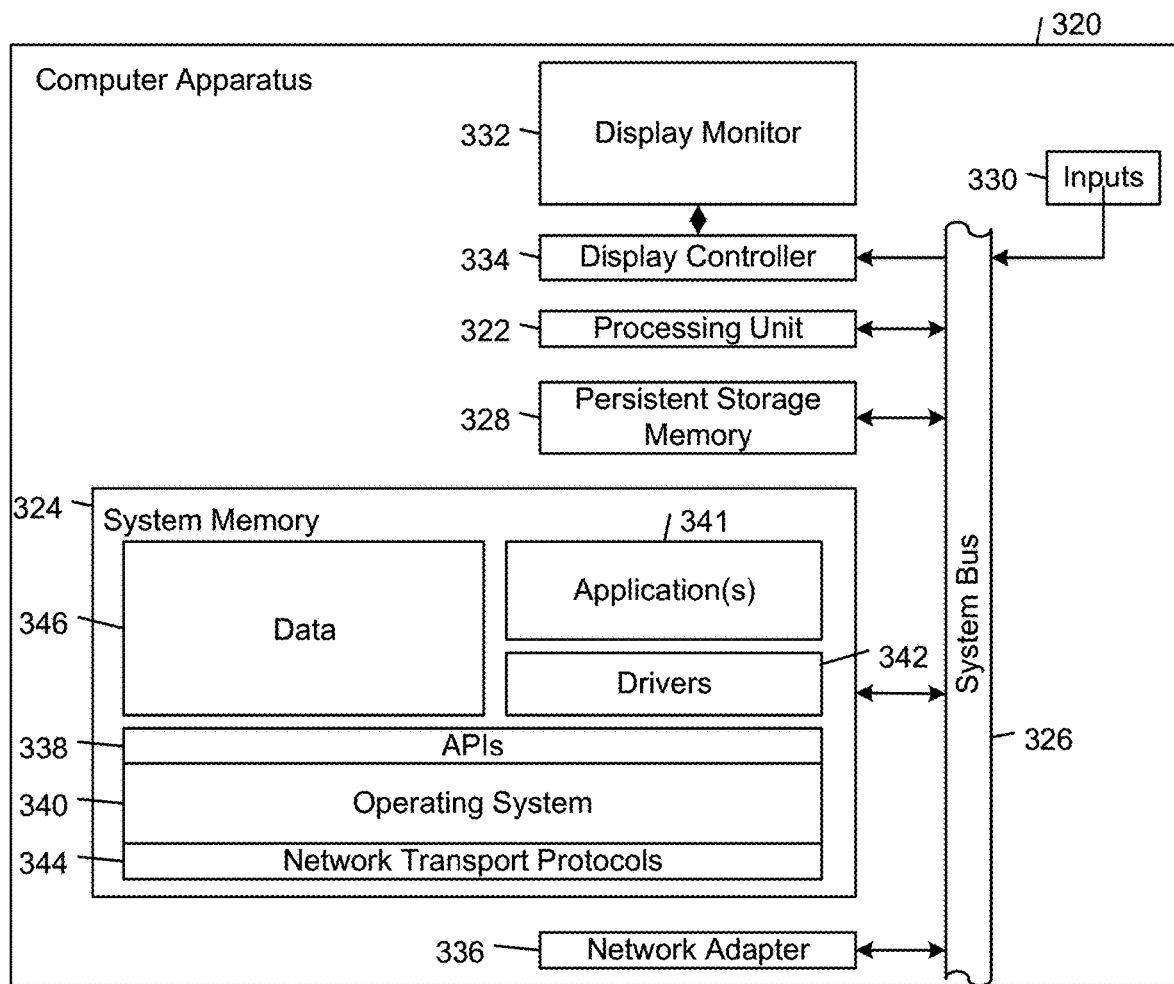

FIG. 18 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for replacing a first wireless node in an IoT system comprising:
    determining, by the first wireless node, that the first wireless node is in need of imminent replacement;
    transmitting, by the first wireless node, a first notification to another wireless node of the IoT system that the first wireless node is in need of imminent replacement;
    initiating, by the first wireless node, a discovery protocol for a second wireless node installed in proximity to the first wireless node;
    upon discovery of the second wireless node, wirelessly connecting, by the first wireless node, with the second wireless node; and
    responsive to successful wireless connection between the first wireless node and the second wireless node, transmitting, by the first wireless node, a configuration file to the second wireless node, wherein
    the second wireless node copies the received configuration file to a storage of the second wireless node, and
    the second wireless node configures itself to operate as a replacement for the first wireless node in the IoT system, based at least in part on the copied configuration file.

2. The method of claim 1, wherein responsive to completing the configuration of the second wireless node, the second wireless node transmits a confirmation to the first wireless node that the second wireless node is successfully configured for replacing the first wireless node in the IoT system.

3. The method of claim 2, further comprising, responsive to receiving the confirmation from the second wireless node, deactivating, by the first wireless node, the first wireless node.

4. The method of claim 2, further comprising, responsive to receiving the confirmation from the second wireless node, performing, by the first wireless node, activities to deplete a battery of the first wireless node.

5. The method of claim 1, wherein the determining the first wireless node is in need of imminent replacement is based on a battery level of the first wireless node being below a threshold level.

6. The method of claim 1, wherein the determining the first wireless node is in need of imminent replacement is based on a diagnostic test of the first wireless node being failed.

7. The method of claim 1, wherein the second wireless node is installed within a threshold distance of the first wireless node.

8. The method of claim 7, wherein the threshold distance corresponds to a wireless range of a wireless communication system of the first wireless node and the second wireless node.

9. The method of claim 1, wherein the first wireless node and the second wireless node are both installed on a same asset.

10. The method of claim 1, wherein the first wireless node is uninstalled from an asset, in response to the second wireless node successfully completing configuration to replace the first wireless node.

11. An adhesive tape platform comprising:
    a flexible substrate;
    a device layer comprising:
        a processor,
        a first wireless communication system, and
        a memory coupled to the processor;
    a battery;
    flexible circuit connecting components of the device layer; and
    a flexible cover layer covering the flexible substrate, the device layer, and the flexible circuit, wherein
    the adhesive tape platform is configured to:
        wirelessly receive a configuration file from a first wireless node using the first wireless communication system,
        copy the received configuration file to the memory,
        complete a configuration of the adhesive tape platform as a replacement for the first wireless node based at least in part on copied configuration file.

12. The adhesive tape platform of claim 11, wherein the adhesive tape platform is installed within a threshold distance from the first wireless node.

13. The adhesive tape platform of claim 11, wherein the adhesive tape platform is installed on an a same asset that the first wireless node is installed on.

14. The adhesive tape platform of claim 13, wherein the first wireless node is also an adhesive tape platform.

15. The adhesive tape platform of claim 11, wherein the first wireless communication system is a Bluetooth or BLE communication system.

16. An Internet of Things (IoT) system comprising:
    a first IoT device installed on an asset and comprising a first type of wireless communication system, the first IoT device configured to:
        monitor the asset, and
        transmit a configuration file using the first type of wireless communication system to an IoT device replacing the first IoT device, in response to determining that the first wireless node needs imminent replacement; and
    a second IoT device installed in proximity to the first IoT device, in response to the first IoT device determining that the first IoT device needs imminent replacement, the second IoT device comprising the first type of wireless communication system and configured to:
        wirelessly receive the configuration file from the first wireless node using the first type of wireless communication system, and
        complete a configuration process for replacing the first IoT device based at least in part on the received configuration file,
    wherein, responsive to the second IoT device completing the configuration process, the second IoT begins operating, assuming a role and identity of the first IoT device in the IoT system.

17. The IoT system of claim 16, wherein the first IoT device receives a confirmation that the second IoT has completed the configuration process, and in response, the first IOT device deactivates.

18. The IoT system of claim 16, further comprising an intermediary IoT device comprising the first type of communications system and configured to coordinate a discovery process for wirelessly connecting the first IoT device to the second IoT device.

19. The IoT system of claim 18, wherein the intermediary IoT device is a line-powered device.

20. The IoT system of claim 16, wherein, responsive to determining that the first IoT device needs imminent replacement, the first IoT device transmits a notification to another wireless node of the IoT system including instructions for a human operator to install the second IoT device in proximity to the first IoT device.

\* \* \* \* \*